(12) United States Patent
Nakadai

(10) Patent No.: US 8,190,630 B2
(45) Date of Patent: May 29, 2012

(54) DATA SEARCH DEVICE, DATA SEARCH SYSTEM, DATA SEARCH METHOD AND DATA SEARCH PROGRAM

(75) Inventor: Shinji Nakadai, Minato-ku (JP)

(73) Assignee: NEC Corporation, Tokyo (JP)

( * ) Notice: Subject to any disclaimer, the term of this patent is extended or adjusted under 35 U.S.C. 154(b) by 274 days.

(21) Appl. No.: 12/595,477

(22) PCT Filed: Mar. 25, 2008

(86) PCT No.: PCT/JP2008/055583
§ 371 (c)(1),
(2), (4) Date: Oct. 9, 2009

(87) PCT Pub. No.: WO2008/132918
PCT Pub. Date: Nov. 6, 2008

(65) Prior Publication Data
US 2010/0131550 A1  May 27, 2010

(30) Foreign Application Priority Data
Apr. 13, 2007  (JP) ................................ 2007-106446

(51) Int. Cl.
*G06F 17/30* (2006.01)

(52) U.S. Cl. .................... 707/769; 370/351; 370/409
(58) Field of Classification Search ............... 370/409, 370/351; 707/769
See application file for complete search history.

(56) References Cited

U.S. PATENT DOCUMENTS
2004/0133590 A1 * 7/2004 Henderson et al. ........... 707/102

FOREIGN PATENT DOCUMENTS
JP  2008-234563 A  10/2008
JP  2008-269141 A  11/2008

OTHER PUBLICATIONS

M. Frans Kaashoek et al., "Koorde: A simple degree-optimal distributed hash table", Peer-to-Peer Systems II, Oct. 10, 2007, pp. 98-107.
Anwitaman Datta et al., "Range Queries in Trie-Structured Overlays" Fifth IEEE International Cone on Peer-to-peer Computing, 2005, pp. 57-66.
Min Cai et al., "MAAN: A Multi-Attribute Addressable Network for Grid Information Services", Journal of Grid Computing, Feb. 22, 2005, pp. 3-14, vol. 2, No. 1.

(Continued)

*Primary Examiner* — Khanh Pham
*Assistant Examiner* — Alexander Khong
(74) *Attorney, Agent, or Firm* — Sughrue Mion, PLLC

(57) ABSTRACT

A range search of data is implemented, being a data search method to achieve a constant degree and a logarithmic hop count. A data search device that is located on a network and searches for data shared with another device, includes a dividing unit that divides a logical identifier range based on a logical identifier between own logical identifier and a logical identifier of a successor if a division condition of the logical identifier range requested to search for is met; and a search request transferring unit that transfers a search request including the logical identifier range acquired by the dividing means to a same or different device that meets a forwarding destination condition of the search request.

18 Claims, 21 Drawing Sheets

OTHER PUBLICATIONS

Artur Andrzejak et al., "Scalable, Efficient Range Queries for Grid Information Services", Peer-to-Peer Computing 2002, Dec. 10, 2002, pp. 33-40.

Changxi Zheng et al., Distributed Segment Tree: Support of Range Query and Cover Query over DHT, IPTPS 2006, Feb. 27, 2006.

Shinji Nakadai et al., "PLATON: Multi-dimensional Range Query System for Data Sharing in Distributed System", Multimedia, Distributed, Cooperative and Mobile (DICOMO 2007), Jul. 4, 2007, pp. 173-184.

* cited by examiner

DECIMAL NUMBER IS DESCRIBED BETWEEN PARENTHESES

DATA SEARCH DEVICE, DATA SEARCH SYSTEM, DATA SEARCH METHOD AND DATA SEARCH PROGRAM

FIELD OF THE INVENTION

The present invention relates to a data search device, a data search method and a data search program for searching data shared with terminals located on a network, and particularly to a data search device, a data search system, a data search method and a data search program employing a graph in which a degree is constant.

BACKGROUND ART

An overlay network is a network which forms and configures a virtual link depending on an object of its higher layer, using an existing link. That is, an overlay network is a higher layer network configured regardless of topology of a lower layer in a computer network. For example, it refers a P2P (Peer to Peer) network which is configured regardless of topology of an IP network.

In the overlay network, a flexible network superior in fault tolerance can easily be configured without requiring a central server. Nodes (peers) perform freely participate in or secede from the network, and the network topology changes dynamically. All the nodes have equal authority and each node can access data which is stored in all the nodes connected to the network.

In the overlay network, when a node has only information (IP addresses) on the adjacent node, a method which relays a query to the adjacent node is adopted to search for data. This search method is superior in ad hoc characteristic because it is not necessary to maintain network topology for search, and it is also superior in fault tolerance by utilizing replication. However, it requires a longer period of time for search and it also lacks scalability. On the other hand, when each node has information of all nodes on the network, the search time is not taken longer, but it is not appropriate in terms of scalability and ad hoc characteristic. Thus, it is important how to search for a node which stores requested data in the overlay network (P2P network).

As a high-speed (Efficient) technique to search for enormous data, a technique in which each node on the overlay network has a Distributed Hash Table (DHT) as route information is employed. As for the distributed hash table, the data are placed on hash space, and each node is in charge of a certain range and maintains and manages data in the range. When a predetermined node searches for data through a key, the key is converted into a hash value by a hash function to perform mapping on the hash space, and then objective node and data are acquired.

A plurality of algorithms are considered as a search algorithm (routing algorithm) using the distributed hash table, Chord and Koorde are included therein. The Chord is an algorithm that implements search efficiency of hop number log (N) by performing a search method similar to a binary search based on a finger table (Finger Table; a table in which node information on IDs, 1, 2, 4, 8, . . . from the own node is registered) on the annular hash space. The Koorde is an algorithm using a deBruijn graph for routing in stead of using a finger table of the Chord. Data search method by the Koorde is described in non-patent document 1. Hereinafter, the data search method described in non-patent document 1 will be explained.

(1) The First Related Art:

FIG. 1 is a flow chart which shows a data search procedure of the first related art. Also, FIG. 2 is an illustration which shows the de Bruijn graph. In the first related art, It is determined which node in the graph shown in FIG. 2 manages the data given a logical identifier Key according to a procedure described in a flow chart shown in FIG. 1.

FIG. 2 is referred to as the deBruijn graph. The deBruijn graph Dk (n) is a graph in which bit strings X whose bit length is n and is made of elements of the set $Zk=\{0, 1, \ldots, k-1\}$ has an ark with respect to all bit strings obtained by bit-shifting all the bit strings to the left and adding $x0 \epsilon Zk$ to the least significant bit. In an example shown in FIG. 2, k is two, n is four.

That is, in the deBruijn graph, in case there are 2n nodes having a logical identifier (node ID) of n bits, links are provided from each node m to nodes of (2m mod 2n) and (2m+1 mod 2n). For example, from a node whose logical identifier of 3 bits is xyz (the ID of the node is xyz), one-way links are provided to a node whose logical identifier is yz0 (the ID of the node is yz0) and a node whose logical identifier is yz1 (the ID of the node is yz1).

In the Koorde, a routing of the deBruijn graph is performed utilizing the one-way link. For example, when a message is transferred from a node whose logical identifier of 3 bits is xyz to a node whose logical identifier of 3 bits is abc, a message is routed to nodes in the order of the logical identifier xyz, yza, zab and abc. That is, the message is transferred to the node whose logical identifier is obtained by sequentially shifting xyzacb to the left, which is a connection of the logical identifier of the initial node and that of the terminal node.

As an example to search for a node managing a logical identifier of data, a case where a node 213 whose logical identifier is 13 (binary indication 1101) in FIG. 2 searches for a node storing the data whose logical identifier is 9 (binary indication 1001) is described.

In a processing shown in FIG. 1, the node 213 searches for "1001", which is a value of a logical identifier key, using a key shift kshift. It is assumed that a value of the initial key shift is the same as that of the logical identifier key of the data. That is, the value of the initial key shift is "1001". First, the node 213 determines whether the own logical identifier m is the same as the logical identifier key (step S101). Because the value of the logical identifier of the node 213 is "1101", and this is different from "1001", which is the value of the logical identifier key (No of step S101), the node 213 sets as a node t, a logical identifier represented by 2m+b mod N, using a first bit b of the key shift kshift and a logical identifier space N (here, because of 4 bits, it is 16) (step S103). Specifically, using the first bit 1 of the key shift "1001" and the logical identifier space 16, the node t becomes 2×13+1 mod 16=11 (binary indication 1011). As described above, in binary indication, this calculation is the same as the processing to bit-shift m to the left and to give the first bit of the key to the least significant bit.

Then the node 213 bit-shifts the value of the key shift kshift "1001" to the left and changes the value to "0010" (step S104). Then the node 211 whose logical identifier is 11 (binary indication 1011) searches for the value of the logical identifier Key "1001" with the value of the key shift kshift "0010" (step S105). This is corresponded to the processing (steps S101-S105) shown in FIG. 1 is moved to the node 211, and a processing of step S101-S105 are performed in a node 211 as the subroutine of the step S105 performed in node 213.

Because the logical identifier "1011" of the node 211 itself is different from the logical identifier Key value "1001" of data (No of step S101), a value of a node t becomes "0110" based on zero, which is the first bit of the key shift "0010", and the logical identifier space 16 (step S103), and a value of the key shift kshift becomes "0100" (step S104). The processing is transited from the node 211 to a new node 206 whose logical identifier is "0110" (step S105). Thereby, the node 206 starts to search for the logical identifier Key value "1001" with the key shift kshift value "0100".

Because the logical identifier "0110" of the node 206 itself is different from the logical identifier Key value "1001" of data (No of step S101), a value of a node t becomes "1100" based on zero, which is the first bit of the key shift "0100", and the logical identifier space 16 (step S103), and a value of the key shift kshift becomes "1000" (step S104). The processing is transited from the node 206 to a new node 212 whose logical identifier is "1100" (step S105). Thereby, the node 212 starts to search for the logical identifier Key value "1001" with the key shift kshift value "1000".

Because the logical identifier "1100" of the node 212 itself is different from the logical identifier Key value "1001" of data (No of step S101), a value of a node t becomes "1001" based on one, which is the first bit of the key shift "1000", and the logical identifier space 16 (step S103), and a value of the key shift kshift becomes "0000" (step S104). The processing is transited from the node 212 to a new node 209 whose logical identifier is "1001" (step S105). Thereby, the node 209 starts to search for the logical identifier Key value "1001" with the key shift kshift value "0000".

Because, the logical identifier "1001" of the node 209 itself is the same as the logical identifier Key value "1001" of the data (Yes of step S101), the node 209 determines that the own node is a node managing the data having the corresponding logical identifier. Then, the node 209 returns to the node 212, a message indicating that the own node has the logical identifier "1001", as a result of step S105 in the node 212 called as a subroutine (step S106).

In step S106 of the node 212, this result is further returned to the node 206 which has called the subroutine. In step S106 of the node 206, this result is returned to the node 211 which has called the subroutine. In step S106 of the node 211, this result is returned to the node 213 which has called the subroutine. Thus, this result about the target node 209 is finally returned to the node 213 which has performed a search.

By performing the above procedures, as shown in the graph of FIG. 2, while a degree, which is the number of nodes referring to other nodes (the number of nodes adjacent to each node, namely the number of nodes that each node links to), is constant (two), a node managing Key of particular data can be found among a total number of N nodes, at the transferring number of log N (the number of hops).

(2) The Second Related Art:

In the first related art, the theoretical algorithm using the de Bruijin graph regardless of an overlay network is explained. However, because each node in the Chord hash space actually exists with an interval (i.e., nodes do not exist in all of the logical identifiers 0-15, when the logical identifier space is 16 (fourth power of two)), the de Bruijin graph in which nodes have all logical identifiers is not applicable. Thus, in the Koorde, an ID on the de Bruijin is assumed to be a virtual ID on the Chord hash space, and a node is in charge of IDs in a certain section. As described above, non-patent document 1 also describes a configuration in which the Koorde is applied to the overlay network.

FIG. 3 is a block diagram which shows a system configuration of the second related art. FIG. 4 is a flow chart which shows a data search procedure in the second related art. FIG. 5 is an explanation drawing which shows an embodiment of a message flow between peers in the second related art.

As shown in FIG. 3, the data search system in the second related art including a plurality of peers 310, 320 and 330 having an address on a network 300. Note that, each peer 310, 320 and 330 is corresponded to the node in the first related art. The peers 310, 320 and 330 have different logical identifiers. More particularly, each peer 310, 320 and 330 includes a peer logical identifier storage 318 and a local data storage 311, a routing table 312, message transferring means 313, communication means 314, left bit shift means 315, first bit acquisition means 316 and registration/search executing means 317.

The peer logical identifier storage 318 stores logical identifiers to distinguish the peer 310 from other peers in an overlay network. The local data storage 311 stores data which the peer 310 manages among data shared with the peers in the overlay network.

The routing table 312 stores a logical identifier of another peer and an address on the network 300 which is necessary to access the peer (cf. a table 500 shown in FIG. 5). For example, an Internet Protocol (IP) address may be used as this address.

A d node and an s node are stored in the routing table. When a logical identifier of each peer is assumed to be m, the d node is a node (peer) corresponding to a "predecessor" whose logical identifier is 2m. Here, the "predecessor" whose logical identifier is 2m is a node (peer) which exists first in the counterclockwise direction from the view of the logical identifier 2m in the ring shown in FIG. 5. This predecessor is in charge of managing data in the hash space till the logical identifier 2m as a responsibility domain. Here, when the size of the logical identifier space is assumed to be N, the logical identifier 2m is referred to as 2m mod N using a congruence equation. In an example shown in FIG. 5, a logical identifier of a peer 516 is 13 (binary indication 1101), and the d node is a peer (node) 515 whose logical identifier 10 (binary indication 1010).

Also, when a logical identifier of each peer is assumed to be m, the s node is a node (peer) corresponding to a "successor" whose logical identifier is m. Here, the "successor" whose logical identifier m is a node which exists first in the clockwise direction from the view of the logical identifier m in the ring shown in FIG. 5. In an example shown in FIG. 5, the logical identifier of the peer 516 is 13 (binary indication 1101), and the s node is a peer (node) 517 whose logical identifier is 15 (binary indication 1111). The logical identifier size N is 16 in this example, but in case the size is greater than this, a processing is performed as 2m mod N, using a congruence equation of mod.

The left bit shift means 315 performs a left bit shift processing based on the algorithm of the Koorde (processing to shift bit strings of m by 1 bit to the left, and to give the first bit of the key to the least significant bit). The first bit acquisition means 316 acquires the first bit of the key shift, and calculate a virtual node i based on the acquired first bit and the logical identifier space.

The registration/search executing means 317 registers and searches for data. The message transferring means 313 transfers a registration request of data and a search message (search request). The communication means 314 transmits to and receives from other peers, the search message via the network 300.

The data search system with such a configuration in the related art operates as follows.

When the registration/search request of data is provided from the outside (e.g., an external user interface), the registration/search executing means 317 of a certain peer m (e.g., the peer 516 with the logical identifier 1101 shown in FIG. 5) calculates a logical identifier where the data is stored, using a hash function. Here, a logical identifier "key" and a key shift "kshift" are set to this calculated logical identifier, and a virtual node i is set to a value of adding 1 to the logical identifier of the peer. For example, it is assumed that a hash value is 0111 (binary indication) in case of searching for a registration destination of data called "Foo", the registration/search executing means 317 calls the message transferring means 313 using these values as arguments.

In the message transferring means 313, each processing of the flow chart shown in FIG. 4 is performed. In the example above, at first a value of a logical identifier key "0111", a value of a key shift kshift "0111" and a virtual node "1110" are provided to the message transferring means 313.

The message transferring means 313 determines whether the logical identifier key is more than m and less than or equal to the successor (step S401). When the logical identifier key is within this range (Yes of step S401), it is determined that the successor is in charge of the logical identifier key. In this case, the search result corresponding to the search request is returned to the peer being the search origin (step S402). When it is not within this range (No of step S401), the message transferring means 313 determines whether the virtual node i is in this range (range more than m and less than or equal to the successor) (step S403).

When the virtual node i is not within this range (No of step S403), the message transferring means 313 calls the successor of the peer m using the arguments (the logical identifier key, the key shift kshift, the virtual node i) which are the same as arguments when the processing is performed in the peer m (step S407). Thereby, the successor performs the processing (steps S401-S407) to search for the logical identifier Key with the key shift kshift and the virtual node i.

When the virtual node i is within this range (Yes of step S403), the first bit acquisition means 316 of the peer m calculates 2m+b mod N, using the logical identifier m of the peer and the first bit b of the key shift kshift, and sets the virtual node i to the logical identifier of the calculation result (step S404). Here, N is the size of the logical identifier space.

Then the left bit shift means 315 shifts the key shift kshift to the left by 1 bit (step S405) and calls a peer which is the d node of the peer m using the acquired logical identifier key, the key shift kshift, and the virtual node i as arguments (step S406). Thereby, the peer being the d node searches for the logical identifier Key with the key shift kshift and the virtual node i (steps S401-S407).

In the example above, as shown in FIG. 5, first, the message transferring means 313 in the peer 516 whose logical identifier is "1101" is called with a value of the logical identifier key "0111", a value of the key shift kshift "0111" and the virtual node i "1110" (521 of FIG. 5). In this case, because the virtual node i exists within the range (1101, 1111) (Yes of step S403), the virtual node i is calculated as "1100" (step S404), the key shift kshift is converted into "1110" (step S405), and a message is transferred to the peer 515 being the d node (step S406; 522 of FIG. 5).

In the peer 515, because the virtual node i "1100" exists within the range (1010, 1101) (Yes of step S403), the virtual node i is calculated as "1001" (step S404), the key shift kshift is converted into "1100" (step S405), and a message is transferred to the node 512 being the d node (step S406; 523 of FIG. 5).

In the peer 512, because the logical identifier key value "0111" does not exist within the range (1010, 1101), (No of step S401) and the virtual node i "1001" does not exist within the range (1010, 1101), (No of step S403), a message is transferred to a peer 513 being the successor of the peer 512 (step S407). In this peer 513 because the logical identifier key value "0111" exists within the range [0110, 1001] (Yes of step S401), it is determined that the successor manages the logical identifier key value "0111". The message transferring means 313 of the peer 513 returns the search result to the peer 516 being the search origin (step S402).

As described above, even in case the number of existing nodes is less than the size of the logical identifier space as shown in FIG. 2, this second related art achieves a constant degree and a logarithmic hop count. Note that, the constant degree means the number of addresses of other peers recognized by each peer is constant regardless of the total number of peers, and the logarithm hop count means that the number of hops from a peer transferring a message to a destination peer is O (log (n)) when the total number of the peers is n.

Non-patent document 1: M. Frans Kaashoek and David R. Karger, "Koorde: A simple degree-optimal distributed hash table"

DISCLOSURE OF THE INVENTION

Problem to be Solved by the Invention

However, the data search method in the above related art enables only an exact match search but not a range search. This is because data storage has only a single logical identifier and a set of a plurality of logical identifiers cannot be handled in the data search method of the related art.

The present invention has been made in consideration of the above problems, and an object of the present invention is to provide a data search device which enable a range search, being a data search technique achieving a constant degree and a logarithmic hop count, and a data search system, a data search method and a data search program thereof.

Means to Solve the Problem

In order to achieve the object, a data search device according to the present invention is a data search device that is located on a network and searches for data shared with another device, including: a dividing unit that divides a logical identifier range based on a logical identifier between own logical identifier and a logical identifier of a successor if a division condition of the logical identifier range requested to search for is met; and a search request transferring unit that transfers a search request including the logical identifier range acquired by the dividing unit to a same or different device that meets a forwarding destination condition of the search request.

A data search system including a plurality of terminals located on a network and searching data shared with the terminals, wherein each terminal including: a dividing unit that divides a logical identifier range based on a logical identifier between own logical identifier and a logical identifier of a successor if a division condition of the logical identifier range requested to search for is met; and a search request transferring unit that transfers a search request including the logical identifier range acquired by the dividing means to a same or different device that meets a forwarding destination condition of the search request.

A data search method that is executed according to a control program by a control unit of a terminal that shares data with another terminal located on a network, the method including: a dividing step of dividing a logical identifier range based on a logical identifier between own logical identifier and a logical identifier of a successor if a division condition of the logical identifier range requested to search for is met; and a search request transferring step of transferring a search request including the logical identifier range acquired by the dividing step to a same or different device that meets a forwarding destination condition of the search request.

A data search program for a computer located on a network to search for data shared with another computer, the program allows the computer to execute: a dividing processing of dividing a logical identifier range based on a logical identifier between own logical identifier and a logical identifier of a successor if a division condition of the logical identifier range requested to search for is met; and a search request transferring processing of transferring a search request including the logical identifier range acquired by the dividing processing to a same or different device that meets a forwarding destination condition of the search request.

Effect of the Invention

As described above, according to the present invention, a range search of data can be surely performed using an overlay data search method with a constant degree and a logarithmic hop count. Although it is necessary to target a set of elements (logical identifier range) satisfying a search formula designated by a searcher to implement the range search, a message (search request) can be transferred to arrive at a peer (node) having a logical identifier which belongs to the range by appropriately dividing the range including a plurality of logical identifiers.

BEST MODE FOR CARRYING OUT THE INVENTION

Hereinafter, exemplary embodiments of the present invention will be described with reference to the drawings.

First Exemplary Embodiment

FIG. 6 is a block diagram which shows a configuration of a data search system according to a first exemplary embodiment. The data search system in the first exemplary embodiment includes a plurality of nodes 110, 120 and 130 having an address on a network 100 as shown in FIG. 6. In FIG. 6, only the nodes 110, 120 and 130 are connected to the network 100, but a plurality of other nodes are also connected to the network 100. Each node is embodied by a computer (terminal), such as a server or a personal computer.

As shown in FIG. 6, the node 110 includes a communication interface (communication IF) 111, a user interface (user IF) 112, a hard disk (HD) 113, a memory 114 and a CPU 115. The other nodes 120 and 130 have the same configuration as the node 110. Each component, such as the communication IF 111 and the user IF 112 is connected via a bus.

In the configuration shown in FIG. 6, the communication IF 111 is connected to the network 100 and is an interface to control transmission and reception of data. The user IF 112 is an interface to display information to a user and accept data entry from the user. As shown in FIG. 6, the user IF 112 is connected to an input unit 116 which the user can input and operate, and accepts data entry from the input unit 116. Note that, in an example shown in FIG. 6, the node 110 and the input unit 116 are configured separately but the input unit 116 may be included as a component of the node 110.

The HD 113 is a storage medium (external storage device) to store a control program (data search program) and various data. Note that, in the example shown in FIG. 6, the HD 113 is shown as a storage medium, but it may be other storage medium, such as a magnet optical disk. The memory 114 is a memory device (main memory device) storing the control program and the data which are directly accessed by the CPU 115. The CPU 115 is a central processing unit performing each processing according to the control program.

An operation of the data search system according to the first exemplary embodiment will be described.

In the first exemplary embodiment, a logical identifier range is a range of a logical identifier which is a target for a range search. A maximum logical identifier is corresponded to an upper limit of the logical identifier range. A minimum logical identifier is corresponded to a lower limit of the logical identifier range. Also, a shifted logical identifier range is a logical identifier range which has been bit-shifted to the left. A shifted maximum logical identifier is a value obtained by bit-shifting the maximum logical identifier. Also, a shifted minimum logical identifier is a value obtained by bit-shifting the minimum logical identifier.

FIG. 7 is a flow chart which shows a data search procedure of the first exemplary embodiment. Note that, the data search procedure shown in FIG. 7 is a procedure when it is assumed that a procedure to search for a logical identifier range idRanges is asynchronously performed in a node m.

When acquiring data within a range specified by the logical identifier range idRanges, a user inputs a search request in which the logical identifier range idRanges is specified into the node m (node of a logical identifier m) from the input unit 116. The data search processing shown in FIG. 7 is performed in the node m, depending on the search request.

In the data search procedure shown in FIG. 7, the CPU115 of the node m determines whether the logical identifier of the node m is only included in the logical identifier range idRanges (step S701). This is determined using the maximum logical identifier and the minimum logical identifier included in the logical identifier range. When it is determined that the logical identifier of the node m is only included as a determination result (Yes of step S701), the CPU115 of the node m determines that the node m itself is a node which hag the data of the logical identifier range requested to search for. Depending on the search request, the CPU115 of the node m returns the node m as the search result to a node that has initially performed the processing shown in FIG. 7 (step S702).

Here, because the node that has initially performed the processing shown in FIG. 7 is the own node, pointer information to the node that has initially performed the processing shown in FIG. 7 is omitted. However, in step S702, when the data search processing shown in FIG. 7 is executed, the pointer information is passed and the search result is returned to the initial node using the pointer information.

When it is determined that the logical identifier of the node m is not only included as the determination result of step S701 (No of step S701), the CPU115 of the node m performs a left bit shift range dividing processing shown in a flow chart of FIG. 8 to the logical identifier range idRanges and acquires a logical identifier range Range0 and a logical identifier range Range1 after the division (step S703).

When the logical identifier range Range0 acquired in step S703 is not Null (No of step S704), the CPU115 of the node m retrieves a zero side next node of the node m, and asynchronously searches for the logical identifier range Range0 in this node (step S705). A processing of this step S705 is the same as a procedure of the data search processing shown in FIG. 7, and it is performed recursively.

When it is determined that the logical identifier range Range0 is Null in step S704 or after step S705 is asynchronously performed (Yes of step S704), the CPU115 of the node m determines whether the logical identifier range Range1 is Null (step S706). When it is determined that the logical identifier range Range1 is not Null (No of step S706), the CPU115 of the node m retrieves a one side next node of the node m, and asynchronously searches for the logical identifier range Range1 in this node (step S707). A processing of this step S707 is the same as a procedure of the data search processing shown in FIG. 7, and it is performed recursively, too.

When it is determined that the logical identifier range Range1 is Null in step S706 or after step S707 is asynchronously performed (Yes of step S706), the processing shown in FIG. 7 terminates. By performing such a procedure, the logical identifier range idRanges is divided sequentially and the result is returned to the node that has initially performed the processing after the search is arrived at the objective node.

FIG. 8 is a flow chart which shows a procedure of the left bit shift range dividing processing. In the left bit shift range dividing processing shown in FIG. 8, when the logical identifier range idRanges is provided, the CPU115 of the node m extracts the maximum logical identifier and the minimum logical identifier, which are targets to be bit-shifted, included in the logical identifier range idRanges (step S601). Then the CPU115 determines whether the first bits of these logical identifiers are the same (step S602).

When the first bits are the same (Yes of step S602) and 1 (Yes of step S606), step S607 is performed and the processing terminates. When the first bit is 0 (No of step S606), step S608 is performed and the processing terminates.

In step S607, when the first bit is 1, the CPU115 bit-shifts to the left, all the logical identifiers in the logical identifier range idRanges, and assigns them to a new logical identifier range Range1, and assigns Null to another new logical identifier range Range0.

In step S608 when the first bits are 0, the CPU115 bit-shifts to the left, all the logical identifiers in the logical identifier range idRanges, and assigns them to a new logical identifier range Range0, and assigns Null to another new logical identifier range Range1.

Since the logical identifier range to which Null is assigned means that it does not substantially exist, it may be interpreted that the assigned logical identifier range idRanges is not divided when it is determined that the first bits are the same in step S602 (Yes of step S602).

When it is determined that the first bits are not the same in step S602 (No of step S602), the CPU115 divides into a plurality of sets (a plurality of logical identifier ranges) so that each set has the same first bit of the logical identifier range which is a target to be bit-shifted and is included in the logical identifier range idRanges. Then the divided ranges are returned.

That is, as shown in FIG. 8, the CPU115 generates a one side minimum logical identifier and a zero side maximum logical identifier (step S603). Here, the one side minimum logical identifier is a logical identifier in which the first bit is 1 and the subsequent bits are 0. Also, the zero side maximum logical identifier is a logical identifier in which the first bit is 0 and the subsequent bits are 1.

Then the CPU115 inputs the logical identifier range idRanges which is equal to or more than the one side minimum logical identifier into a new logical identifier range Range1, and inputs the logical identifier range idRanges which is equal to or less than the zero side maximum logical identifier into another new logical identifier range Range0 (step S604). In this way, in the left bit shift range dividing processing, the logical identifier range is divided based on the difference between the first bit of the maximum logical identifier and that of the minimum logical identifier.

The CPU115 bit-shifts each logical identifier of the new logical identifier ranges, Range0 and Range1 to the left (step S605). In the example shown in FIG. 8, the left bit shift is performed after the logical identifier range idRanges is divided into the logical identifier ranges Range0 and Range1. However, it may be divided to the logical identifier ranges Range0 and Range1 after the logical identifier range idRanges is bit-shifted to the left. Also, the left bit shift may be performed at the same time when the logical identifier range idRanges is divided into the logical identifier ranges Range0 and Range1.

Then an example of the operation of the data search system (example of the procedure of the data search processing) according to the first exemplary embodiment will be described with reference to FIGS. 9 and 10.

FIG. 9 is an illustration which shows the de Bruijn graph according to the first exemplary embodiment. Also, FIG. 10 is an illustration visually showing an algorithm of the left bit shift range dividing processing according to the first exemplary embodiment.

As shown in FIG. 9, it is assumed that a node which has a logical identifier exists in a network, and a node 413 whose logical identifier is 13 (binary indication "1101") will acquire data whose logical identifier range is [7, 11].

As for nodes corresponding to the logical identifiers in FIG. 9, a node 407 has a logical identifier 7 (binary indication "0111"); a node 408 has a logical identifier 8 (binary indication "1000"); a node 409 has a logical identifier 9 (binary indication "1001"); a node 410 has a logical identifier 10 (binary indication "1010"); and a node 411 has a logical identifier 11 (binary indication "1011"). Although, these nodes are scattered in the network, by adopting a procedure shown in the first exemplary embodiment, the data can be acquired from such scattered nodes.

A logical identifier range shown in 1201 of FIG. 10 is a logical identifier range [7, 11], which is requested to search for. And there are described bit strings of the maximum logical identifier and the minimum logical identifier before the left bit shift is performed as a hierarchy structure. The logical identifier ranges in 1202-1213 of FIG. 10 shows bit strings of a shifted minimum logical identifier and a shifted maximum logical identifier as a hierarchy structure. Also, in the logical identifier ranges shown in 1201-1213 of FIG. 10, a decimal number of the minimum logical identifier value corresponding to the bit strings is described adjacent to Min. and a decimal number of the minimum logical identifier value which has not been shifted is also described between parentheses adjacent to the above minimum logical identifier value. Moreover, in the logical identifier ranges shown in 1201-1213 of FIG. 10, a decimal number of the maximum logical identifier value corresponding to the bit strings is described adjacent to Max. and a decimal number of the maximum logical identifier value which has not been shifted is also described between parentheses. Moreover, the first bit of the tree structure before the bit shift has been performed is shown at the left of the Root of the tree structure.

First, the node 413 searches for the logical identifier range [7, 11] shown in 1201 of FIG. 10. In step S701 shown in FIG. 7, the CPU115 of the node 413 determines whether the logical identifier "1101" of the node 413 is only included in the logical identifier range [7, 11] (step S701). However, in the example above, the logical identifier "1101" of the node 413 is not included in the logical identifier range [7, 11] (range between the minimum logical identifier "0111" and the maximum logical identifier "1011"). The condition of step S701 is not satisfied (No of step S701). Thus, the CPU115 of the node 413 bit-shifts the logical identifier range [7, 11] to the left, and divides it into a logical identifier range [7, 7] (1203 of FIG. 10) and a logical identifier range [8, 11] (1202 of FIG. 10) (step S703).

Specifically, the CPU115 of the node 413 divides the logical identifier range into a plurality of logical identifier ranges by performing the processing shown in FIG. 8. That is, the CPU115 of the node 413 extracts the first bit of the maximum logical identifier and the first bit of the minimum logical identifier included in the logical identifier range [7, 11] (step S601). Here, the first bit "1" in the maximum logical identifier "1011" and the first bit "0" in the minimum logical identifier "0111" are extracted.

The CPU115 determines whether the first bit of the minimum logical identifier is the same as that of the maximum logical identifier (step S602). In the example above, since the first bit are "1" and "0" and not the same (No of step S602), the CPU115 generates a one side minimum logical identifier and a zero side maximum logical identifier (step S603). Here, the one side minimum logical identifier is "1000", and the zero side maximum logical identifier is "0111".

Next, the CPU115 inputs into the new logical identifier range Range1, a logical identifier range which is equal to or more than the one side minimum logical identifier "1000" in the logical identifier range [7, 11], and inputs into the other new logical identifier range Range0, a logical identifier range which is equal to or less than the zero side maximum logical identifier "0111" in the logical identifier range [7, 11] (step S604). In the example above, the logical identifier ranges [8, 11], which is equal to or more than the one side minimum logical identifier "1000" in the logical identifier ranges [7, 11], is input into the new logical identifier range Range1. Also, the logical identifier ranges [7, 7], which is equal to or less than the zero side maximum logical identifier "0111" in the logical identifier ranges [7, 11], is input to the other new logical identifier range Range0. In this way, by performing the left bit shift range dividing processing, the logical identifier range [7, 11] is divided into a logical identifier range [7, 7] and a logical identifier range [8, 11] based on the difference in the first bit.

The CPU115 of the node 413 bit-shifts all the logical identifiers in the new logical identifier range Range0 (logical identifier range [7, 7]) to the left, and also bit-shifts all the logical identifiers in the new logical identifier range Range1 (logical identifier range [8, 11]) to the left (step S605). In this way, the logical identifier range Range0 (1203 of FIG. 10) and the logical identifier range Range1 (1202 of FIG. 10) which have been divided and bit-shifted to the left are obtained.

Next, the CPU115 of the node 413 determines whether the new logical identifier range Range0 (logical identifier range [7, 7]), which has been divided in step S703, is Null (step S704). In the example above, because the logical identifier range Range0 is not Null (No of step S704), the CPU115 transfers a message to the node 410 being the zero side next node of the node 413, and the logical identifier range Range0 is searched for in the node 410 (step S705).

Also, the CPU115 of the node 413 determines whether the new logical identifier range Range1 (logical identifier range [8, 11]), which has been divided in step S703, is Null (step S706). In this case, because the logical identifier range Range1 is not Null in the example (No of step S706), the CPU115 transfers a message to the node 411 being the one side next node of the node 413, and the logical identifier range Range1 is searched for in the node 411 (step S707).

Then, the node 411 searches for the logical identifier range [8, 11] shown in 1202 of FIG. 10. The node 411, which accepts the range search request of the logical identifier range [8, 11] from the node 413 determines whether the logical identifier range [8, 11] includes only the logical identifier "1011" of the own node (step S701).

Because the logical identifier range [8, 11] does not include only the logical identifier "1011" of the node 411 (No of step S701), the CPU115 of the node 411 bit-shifts the logical identifier range [8, 11] to the left, and divides into a plurality of logical identifier ranges (left bit shift range dividing processing shown in FIG. 8) (step S703). However, it is not divided into two because the first bit of the lower limit is the same as that of the upper limit in the logical identifier range.

Specifically, the CPU115 of the node 411 extracts the first bit of the maximum logical identifier and the first bit of the minimum logical identifier in the logical identifier range [8, 11] (step S601). As shown in the logical identifier range 1202 of FIG. 10, the first bit "0" of the maximum logical identifier "0110" and the first bit "0" of the minimum logical identifier "0000" are extracted.

The CPU115 determines whether the first bit of the minimum logical identifier and that of the maximum logical identifier are the same (step S602). In the example above, each first bit is "0" and the same (Yes of step S602). Thus, the CPU115 determines the first bit is "0" (No of step S606), bit-shifts the logical identifiers in the logical identifier range (1202 of FIG. 5) to the left, inputs the logical identifier range which has been bit-shifted to the left into the new logical identifier range Range0, and inputs Null into the other new logical identifier range Range1 (step S608).

Then, the CPU115 of the node 411 determines whether the new logical identifier range Range0 (1204 of FIG. 10), which has been only bit-shifted, is Null (step S704). Then, because the logical identifier range Range0 is not Null (No of step S704), the CPU115 transfers a message to the node 406 being the zero side next node of the node 411, and the identifier range Range0 is searched for in the node 406 (step S705).

Note that, the CPU115 of the node 411 determines whether the new logical identifier range Range1 is Null (step S706). Because the logical identifier range Range1 is Null (Yes of step S706), step S707 is not performed.

Then the logical identifier range [7, 7] shown in 1203 of FIG. 10 is searched for in the node 410. The node 410 which accepts the range search request of the logical identifier range [7, 7] from the node 413 determines whether the logical identifier range [7, 7] includes only the logical identifier "1010" of the own node (step S701).

Because the logical identifier range [7, 7] does not include only the logical identifier "1010" of the node 410 (No of step S701), the CPU115 of the node 410 bit-shifts the logical identifier range [7, 7] to the left and divides it into a plurality of logical identifier ranges (left bit shift range dividing processing shown in FIG. 8) (step S703). However, it is not divided into two because the first bit of the lower limit is the same as that of the upper limit in the logical identifier range.

Specifically, the CPU115 of the node 410 extracts the first bit of the maximum logical identifier and the first bit of the minimum logical identifier in the logical identifier range [7, 7] (step S601). As shown in the logical identifier range 1203 of FIG. 10, both of the maximum logical identifier and the minimum logical identifier are "1110", and thus, the first bits "1" are extracted.

The CPU115 determines whether the first bit of the minimum logical identifier and the first bit of the maximum logical identifier are the same (step S602). In the example above, each first bit is "1" and the same (Yes of step S602). Thus, the CPU115 determines that the first bit is "1" (Yes of step S606), bit-shifts the logical identifiers in the logical identifier range (1203 of FIG. 10) to the left, inputs the logical identifier ranges which have been bit-shifted to the left into the new logical identifier range Range1, and inputs Null into the other new logical identifier range Range0 (step S607).

Then, the CPU115 of the node 410 determines whether the new logical identifier range Range1 which has been only bit-shifted to the left (1205 of FIG. 10) is Null (step S706). Because the logical identifier range Range1 is not Null (No of step S706), the CPU115 transfers a message to the node 405 being the one side next node of the node 410, and the logical identifier range Range1 is searched for in the node 405 (step S707).

Note that, the CPU115 of the node 410 determines whether the new logical identifier range Range0 is Null (step S704). Because the logical identifier range Range0 is Null (Yes of step S704), step S705 is not performed.

The node 406 searches for the logical identifier range [8, 11] shown in 1204 of FIG. 10. In step S701 shown in FIG. 7, the CPU115 of the node 406 determines whether the logical identifier "0110" of the node 406 is only included in the logical identifier range [8, 11] (step S701). However, in the example above, because the logical identifier range [8, 11] does not include only the logical identifier "0110" of the node 406 (No of step S701), the CPU115 of the node 406 bit-shifts the logical identifier range [8, 11] to the left, and divides it into a logical identifier range [8, 9] (1207 of FIG. 10) and a logical identifier range [10, 11](1206 of FIG. 10) (step S703).

Specifically, the CPU115 of the node 406 divides a logical identifier range into a plurality of logical identifier ranges by performing the processing shown in FIG. 8. That is, the CPU115 of the node 406 extracts the first bit of the maximum logical identifier and the first bit of the minimum logical identifier in the logical identifier range [8, 11] (step S601). Here, the first bit "1" of the maximum logical identifier "1000" and the first bit "0" of the minimum logical identifier "0000" are extracted.

The CPU115 determines whether the first bit of the minimum logical identifier is the same as that of the maximum logical identifier (step S602). In the example above, because the first bits are "1" and "0" and not the same (No of step S602), the CPU115 generates a one side minimum logical identifier and a zero side maximum logical identifier (step S603).

Here, the one side minimum logical identifier is "1010" (decimal indication "10"). That is, the logical identifier range shown in 1204 of FIG. 10 has been bit-shifted twice before (a shift count is "2"). The values that has been extracted (pushed out) by two times of the bit shifts are "1" and "0" ("1" is extracted in 1202 of FIG. 10, and "0" is extracted in 1204 of FIG. 10). From this, the value of the one side logical identifier range before bit-shifting is "101*" ("*" is "0" or "1"). Thus, the one side minimum logical identifier becomes "1010".

Also, the zero side maximum logical identifier is "1001" (decimal indication "9"). That is, the logical identifier range shown in 1204 of FIG. 10 has been bit-shifted twice before (a shift count is "2"). The values that has been extracted (pushed out) by two times of the bit shifts are "1" and "0" ("1" is extracted in 1202 of FIG. 10, and "0" is extracted in 1204 of FIG. 10). From this, the value of the zero side logical identifier range before bit-shifting is "100*" ("*" is "0" or "1"). Thus, the zero side maximum logical identifier becomes "1001".

Then, the CPU115 inputs into the new logical identifier range Range1, a logical identifier range which is equal to or more than the one side minimum logical identifier "1010" in the logical identifier range [8, 11], and inputs into the other new logical identifier range Range0, a logical identifier range which is equal to or less than the zero side maximum logical identifier "1001" in the logical identifier range [8, 11] (step S604). In the example above, a logical identifier range [10, 11] which is equal to or more than the one side minimum logical identifier "1010" in the logical identifier range [8, 11] is input into the new logical identifier range Range1. Also, a logical identifier range [8, 9] which is equal to or less than the zero side maximum logical identifier "1001" in the logical identifier ranges [8, 11] is input into the other new logical identifier range Range0. In this way, by performing the left bit shift range dividing processing, the logical identifier range [8, 11] is divided into the logical identifier range [8, 9] and the logical identifier range [10, 11] based on the difference in the first bit.

Then, the CPU115 of the node 406 bit-shifts all the logical identifiers in the new logical identifier range Range0 (logical identifier range [8, 9]) to the left, and bit-shifts all the logical identifiers in the new logical identifier range Range1 (logical identifier range [10, 11]) to the left (step S605). In this way, the logical identifier range Range0 (1207 of FIG. 10) and the logical identifier range Range1 (1206 of FIG. 10) which have been divided and bit shifted to the left are obtained.

Next, the CPU115 of the node 406 determines whether the new logical identifier range Range0 (logical identifier range [8, 9]) which has been divided in step S703 is Null (step S704). In the example above, because the logical identifier range Range0 is not Null (No of step S704), the CPU115 transfers a message to the node 412 being the zero side next node of the node 406, and the logical identifier range Range0 is searched for in the node 412 (step S705).

Also, the CPU115 of the node 406 determines whether the new logical identifier range Range1 (logical identifier range [10, 11]), which has been divided in step S703, is Null (step S706). In this case, because the logical identifier range Range1 is not Null in the example (No of step S706), the CPU115 transfers a message to the node 413 being the one side next node of the node 406, and the logical identifier range Range1 is searched for in the node 413 (step S707).

After that, the logical identifier range [8, 9] is divided into a logical identifier range [8, 8] (1212 of FIG. 10) and a logical identifier range [9, 9] (1211 of FIG. 10) in the node 412, and those are transferred to the nodes 408 and 409, similarly. The logical identifier range [10, 11] is also divided into a logical identifier range [10, 10] (1210 of FIG. 10) and a logical identifier range [11, 11] (1209 of FIG. 10) in the node 413. Then those are transferred to the nodes 410 and 411, respectively.

On the other hand, the logical identifier range [7, 7] transferred to the node 405 is not divided because the first bit of the upper limit and that of the lower limit are the always same (Yes of step S602). The logical identifier range is transferred from the node 405 to the node 411 and from node 411 to node 407, while being bit-shifted to the left, as is shown in 1205 to 1208 of FIG. 10 and 1208 to 1213 of FIG. 10.

Because the logical identifier range which is passed to the node 407, the node 408, the node 409, the node 410, and the node 411, includes only the logical identifier range of each node (Yes of step S701 of FIG. 7), the CPU115 of each node returns a result to the node 413 that has initially issued a request (step S702).

As described the above, in the first exemplary embodiment, a logical identifier range is bit-shifted to the left while being divided based on the difference in the first bit so that a search message is passed to a node whose logical identifier belongs to the logical identifier range being a search target. By using technique to divide the logical identifier range, a range search on a graph can be implemented, achieving a constant degree and a logarithmic hop count.

Second Exemplary Embodiment

In the first exemplary embodiment, there is explained the algorithm of the theoretical range search using the de Bruijin graph regardless of an overlay network. However, because each node actually exists in the Chord hash space with an interval (i.e., nodes do not exist in all of the logical identifiers 0-15 when the logical identifier space is 16 (fourth power of two)), the de Bruijin graph in which nodes having all logical identifiers is defined is not applicable. Thus, in the second exemplary embodiment, a logical identifier (ID) on the de Bruijin is assumed as a virtual ID on the Chord hash space, and one node is in charge of IDs in a certain section.

FIG. 11 is a block diagram which shows a configuration of a data search system in the second exemplary embodiment. As shown in FIG. 11, the data search system according to the second exemplary embodiment includes a plurality of peers 810, 820 and 830 having an address on a network 800. In FIG. 11, the peers 810, 820 and 830 are only connected to the network 800, but a plurality of other peers are also connected to the network 800. Each peer is embodied by a computer (a central processing unit; a processor; a data processor), such as a server that operates controlled by a program (a hardware configuration of the computer is similar to that shown in FIG. 6). Note that, in this embodiment, the peer is the same as the node.

As shown in FIG. 6, the peer 810 includes a peer logical identifier storage 818, a local data storage 811, a routing table 812, message transferring means 813, communication means 814, range dividing means 815, left bit shift range dividing means 816 and registration/search executing means 817. Note that, the other peers 820 and 830 have the same configuration as the peer 810.

Each of the storages (the local data storage 811, the routing table 812 and the peer logical identifier storage 818) composing the peer 810 generally stores the following data.

In the peer logical identifier storage 818 stores a logical identifier (node ID) of a peer (e.g., peer 810) in an overlay network. The logical identifier is an identifier to identify each peer on the overlay network.

The local data storage 811 stores data of which the corresponding peer (e.g., peer 810) is in charge among data (content) shared with all peers. Which part of data each peer is in charges of (manages) depends on a logical identifier of each peer stored in the logical identifier storage 818.

The routing table 812 is a table referred to when each peer performs routing. The routing table 812 stores a plurality of sets of logical identifiers of other peers and addresses (e.g., Internet Protocol (IP) address) on the network 800. A management method of this routing table (i.e., a set of a network address and a logical identifier of which peer is stored among all peers) is the same as the Koorde as described in non-patent document 1. As mentioned above, the routing table 812 stores a set of an address and a logical identifier of a predecessor whose logic identifier is twice as large as the logical identifier of the corresponding peer, and a set of an address and a logical identifier of a successor of the corresponding peer.

The means (the message transferring means 813, the communication means 814, the range dividing means 815, the left bit shift range dividing means 816, and the registration/search executing means 817) composing the peer 810 generally operates as follows.

The range dividing means 815 divides a given logical identifier range with the logical identifier of the peer stored in the routing table 812 as a boundary value. For example, the given logical identifier is divided into a logical identifier range determined by the logical identifier range of the peer and the minimum logical identifier, and a logical identifier range determined by the logical identifier of the peer and the maximum logical identifier, when the logical identifier of the peer is included in the logical identifier range. At this time, the shifted maximum logical identifier and the shifted minimum logical identifier range are also divided.

The left bit shift range dividing means 816 bit-shifts the given logical identifier range to the left and outputs a plurality of different logical identifier ranges based on the first bit before bit-shifting to the left. This procedure is the same as a procedure of the left bit shift range dividing processing in the first exemplary embodiment shown in FIG. 8.

The registration/search executing means 817 registers and searches for data. For example, the registration/search executing means 817 is called when there is a search request from an external program. At that time, the registration/search executing means 817 generates a logical identifier range depending on the search condition, passes it to the message transferring means, and provides the returned search result to the external program.

The message transferring means 813 transfers a request for registering data and a search message (search request). To determine a destination of the message, the logical identifier range in the message is used. This logical identifier range stores the minimum logical identifier, the maximum logical identifier, the shifted maximum logical identifier and the shifted minimum logical identifier.

The communication means 814 specifies an address of another peer on the network 800 and transmits and receives a message on the network 800. Thereby, the message transferring means 813 of a certain peer can call the message transferring means 813 of another peer.

Next, an operation of the data search system according to the second exemplary embodiment will be described.

FIG. 12 is a flow chart which shows the whole operation of the data search system according to the second exemplary embodiment. First, the registration/search executing means 817 of the peer m accepts a search request including a search formula Query, converts into a logical identifier range list Ranges corresponding to the search formula Query and acquires it, as shown in FIG. 12 (step S1001). Note that, for example, the search request is input into the registration/search executing means 817 of the peer m depending on a manipulation of the input unit by a search requester (user) (116 of FIG. 6).

Then the registration/search executing means 817 of the peer m initializes a list Results, which stores a search result (step S1002), and activates a process to store the search result message (reception result) from another peer in this list Results (step S1002).

Then the registration/search executing means 817 of the peer m sets a timer with a maximum time to wait for the search results as a time out (Timeout) (step S1003). The registration/search executing means 817 of the peer m sets a virtual node i (step S1004). Preferably a logical identifier of this virtual node i is chosen optionally from the logical identifiers between the peer m and the successor peer.

Then the registration/search executing means 817 of the peer m asynchronously calls the message transferring means 813 with a logical identifier range list provided in step S1001 and the virtual node i as arguments (step S1005). Thereby, each processing of a flow chart shown in FIG. 13 is performed in the message transferring means 813.

After that, the registration/search executing means 817 of the peer m waits (continues to wait) until the search results corresponding to all the logical identifiers in the logical identifier range list are obtained, or until the timeout becomes 0 or less (step S1006), while subtracting from the value of the timer each constant time (interval) (step S1007).

After a waiting condition is satisfied, (when the search results for all the logical identifiers in the logical identifier ranges list are obtained or the timer becomes in the state of the time-out), the registration/search executing means 817 of the peer m provides the search requester with the result list Results storing the search results transmitted from another peer (step S1008).

FIG. 13 is a flow chart which shows the data search procedure of the second exemplary embodiment. In the peer m, the message transferring means 813 provides the logical identifier range idRanges and the logical identifier s of the Successor to the range dividing means 815 on receiving a request to search for the logical identifier range idRanges using the virtual node i (step S1005 of FIG. 12). The range dividing means 815 divides the logical identifier range idRanges into two logical identifier ranges, LowRanges and HighRanges, based on the logical identifier s of the Successor (step S901). Then the range dividing means 815 passes the two divided logical identifier ranges LowRanges and HighRanges to the message transferring means 813.

The message transferring means 813 determines whether the logical identifier range LowRanges is Null (step S902). When the logical identifier range LowRanges is not Null (No of step S902), the message transferring means 813 searches for data in the local data storage 811, the data being corresponded to the logical identifier before bit-shifting (data which matches the search formula corresponded to the logical identifier range LowRanges) included in the logical identifier range LowRanges (step S903). Then the search result is passed to a searcher.

Next, the message transferring means 813 determines whether the logical identifier range HighRanges is Null (step S904). When the logical identifier range HighRanges is Null (Yes of step S904), the search in the peer m terminates. When the logical identifier range HighRanges is not Null (No of step S904), the message transferring means 813 determines whether the virtual node i is included in (m, s] (step S905). The (m, s] shows a range which is more than m (logical identifier of the peer m) and equal to or less than s (logical identifier of the Successor).

When the virtual node i is not included in the range (m, s] (No of step S905), the message transferring means 813 calls the message transferring means 813 of the peer s (Successor) with the same logical identifier range idRanges and the virtual node i as arguments (step S911). Thereby, in the peer s (Successor), a processing to search for the logical identifier range idRanges using the virtual node i (processing shown in FIG. 8) is performed. Thus, the search processing in this peer m terminates.

When the virtual node i is included in the range of (m, s) (Yes of step S905), the message transferring means 813 passes the logical identifier range HighRanges to the left bit shift range dividing means 816. The left bit shift range dividing means 816 bit-shifts the logical identifier range HighRanges to the left, and divides into two logical identifier ranges Range0 and Range1 (step S906). Note that, a procedure to divide the logical identifier range by the left bit shift range dividing means 816 is the same as the procedure by the left bit shift range dividing processing according to the first exemplary embodiment shown in FIG. 8. The left bit shift range dividing means 816 provides the two divided logical identifier ranges Range0 and Range1 to the message transferring means 813.

Then, the message transferring means 813 determines whether the logical identifier range Range0 is Null (step S907). When the logical identifier range Range0 is not Null (No of step S907), the message transferring means 813 calls the message transferring means 813 of a peer d (Predecessor) with the logical identifier range Range0 and a virtual node 2×i (mod N), which is a value obtained by bit-shifting the virtual node i to the left (step S908). Thereby, in the peer d (Predecessor), a processing to search for the logical identifier range Range0 using the virtual node 2×i (mod N) (processing shown in FIG. 13) is performed.

Furthermore, the message transferring means 813 determines whether the logical identifier range Range1 is Null (step S909). When the logical identifier range Range1 is not Null (No of step S909), the message transferring means 813 calls the message transferring means 813 of the peer d with the logical identifier range Range1 and a virtual node 2×i+1 (mod N), which is a value obtained by bit-shifting the virtual node i and setting the least significant bit to 1 (step S910). Thereby, in the peer d (Predecessor), a processing to search for the logical identifier range Range1 using the virtual node 2×i+1 (mod N) (processing shown in FIG. 13) is performed. Then, this processing terminates.

Then an example of the operation of the data search system (example of the operation of the data search) according to the second exemplary embodiment will be described with reference to FIGS. 14 and 15.

FIG. 14 is an illustration which shows an example of a message flow between peers according to the second exemplary embodiment. FIG. 15 is an illustration visually showing an algorithm of the left bit shift range dividing processing according to the second exemplary embodiment.

FIG. 14 shows a plurality of peers participating on an overlay network. It is assumed that a peer 1316 whose logical identifier is 13 executes $\{7 \leq temperature \leq 11\}$ as a search formula Query. Here, the temperature being an attribute is corresponded to a logical identifier range.

In this case, the registration/search executing means 817 of the peer 1316 calculates the logical identifier range idRanges which is corresponded to the search formula Query, and obtains the logical identifier range [7, 11] (step S1001). Then the registration/search executing means 817 initializes the result lists Results and activates a process which accepts results from another peer (step S1002), sets the time-out to the timer (step S1003), and sets the virtual node i (step S1004).

The virtual node i may be any value, but preferably a logical identifier which is more than own logical identifier and equal to or less than a logical identifier of the Successor. Moreover it preferably includes the first bit of the logical identifier of the destination in the lower bits as long as possible. In this case, because the logical identifier 1110 and the logical identifier 1111 satisfy the former condition, the left bit shift range dividing processing may be performed so that the lower bits can have the first bit of the logical identifier of the destination as long as possible.

The logical identifier range 1401 shown in FIG. 15 is divided into a logical identifier range 1402 whose range is [8, 11] and a logical identifier range 1403 whose range is [7, 7] by the left bit shift range dividing processing (processing shown in FIG. 8). The first bit of the former logical identifier range [8, 11] before bit-shifting is 1, and the first bit of the latter logical identifier range [7, 7] before bit-shifting is 0. Although the left bit shift range division can be performed in the peer 1316, the further division is not performed because the second least significant bits (first bits before bit-shifting) of the logical identifier 1110 and the logical identifier 1111, which satisfy the above condition, are not zero, if the left bit shift range division is further performed to the latter logical identifier range [7, 7]. On the other hand, the left bit shift division can be performed to the former logical identifier range [8, 11] in the peer 1316.

When the left bit shift range division is performed to the logical identifier range 1402 (logical identifier range [8, 11])

shown in FIG. 15, Zero can be obtained as the first bit. Then, the logical identifier range 1404 (logical identifier range [8, 11]) can be obtained. Here, because it is impossible to perform the further left bit shift range division, it is not divided any more.

As described above, in step S1005, the peer 1316 searches for the logical identifier range [8, 11] using the virtual node "1110" (1321 of FIG. 14), and the logical identifier range [7, 7] using the virtual node "1110" (1322 of FIG. 14).

In the peer 1316, the registration/search executing means 817 calls the message transferring means 813 and searches for the logical identifier range [8, 11] using the virtual node "1110" (step S1005). Thereby, the message transferring means 813 performs the processing shown in FIG. 13.

First, the message transferring means 813 of the peer 1316 passes the logical identifier range [8, 11] and the logical identifier 15 ("1111") of a peer 1317, which is the Successor of the peer 1316, to the range dividing means 815. The range dividing means 815 divides the logical identifier range [8, 11] with the logical identifier 15 of the peer 1317, which is the Successor of the peer 1316, as a boundary value (step S901). However, because this logical identifier range [8, 11] does not include the logical identifier "15", Null is input into the logical identifier range LowRanges, and [8, 11] is input into the logical identifier range HighRanges. As a result, a determination result of step S902 becomes Yes, and a determination result of step S904 becomes No. Therefore, the message transferring means 813 determines whether the virtual node "1110" is included in the range (1101, 1111) (step S905).

Because the virtual node "1110" is included in the range (1101, 1111) (Yes of step S905), the message transferring means 813 makes the left bit shift range dividing means 816 bit-shift the corresponding logical identifier range [8, 11] to the left and divide into two logical identifier ranges of Range0 and Range1 (step S906). As a result, a logical identifier range [8, 9] is stored in the Range0 (1407 of FIG. 15), and a logical identifier range [10, 11] is stored in the Range1 (1406 of FIG. 15).

The message transferring means 813 determines whether the logical identifier range Range0 is Null (step S907). Because the logical identifier range Range0 ([8, 9]) is not Null (No of step S907), the message transferring means 813 calls message transferring means 813 of the peer 1315 which is a d node (Predecessor) of the peer 1316 with the logical identifier range [8, 9] and the virtual node "1100" (step S908). This is corresponded to 1323 of FIG. 14. Thereby, the peer 1315 performs a processing to search for the logical identifier range [8, 9] using the virtual node "1100" (processing shown in FIG. 13).

Also, the message transferring means 813 determines whether the logical identifier range Range1 is Null (step S909). Then, because the logical identifier range Range1 ([10, 11]) is not Null (No of step S909), the message transferring means 813 calls the message transferring means 813 of the peer 1315 which is the d node (Predecessor) of the peer 1316 with the logical identifier range [10, 11] and the virtual node "1101" (step S910). This is corresponded to 1324 of FIG. 14. Thereby, the peer 1315 performs a processing to search for a logical identifier range [10, 11] using the virtual node "1101" (processing shown in FIG. 13).

Also, in the peer 1316, when the logical identifier range [7, 7] is searched for using the virtual node "1110", the registration/search executing means 817 calls the message transferring means 813 so that it similarly performs the processing shown in FIG. 13 (step S1005).

The message transferring means 813 of the peer 1316 passes the logical identifier range [7, 7] and the logical identifier 15 ("1111") of the peer 1317, which is the Successor of the peer 1316, to the range dividing means 815. The range dividing means 815 divides the logical identifier range [7, 7] with the logical identifier 15 of the peer 1317, which is the Successor of the peer 1316, as a boundary value (step S901). However, because this logical identifier range [7, 7] does not include the logical identifier "15", Null is input into the logical identifier range LowRanges, and [7, 7] is input into the logical identifier range HighRanges. Therefore, a determination result of step S902 becomes Yes, and a determination result of step S904 becomes No. And, the message transferring means 813 determines whether the Virtual node "1110" is included in the range (1101, 1111) (step S905).

Because the virtual node "1110" is included in the range (1101, 1111) (Yes of step S905), the message transferring means 813 makes the left bit shift range dividing means 816 bit-shift the logical identifier range [7, 7] to the left and divide into two logical identifier ranges Range0 and Range1 (step S906). Herein, Only the left bit shift is performed without dividing (cf. steps S602, S606 and S607 of FIG. 8), and Null is stored in the Range0, and the logical identifier range [7, 7] (1405 of FIG. 15) is stored in the Range1.

The message transferring means 813 determines whether the logical identifier range Range0 is Null (step S907). Because the logical identifier range Range0 is Null (Yes of step S907), the message transferring means 813 determines whether the logical identifier range Range1 is Null, without performing step S908 (step S909). At this time, because the logical identifier range Range1 ([7, 7]) is not Null (No of step S909), the message transferring means 813 calls the message transferring means 813 of the peer 1315, which is the d node (Predecessor) of the peer 1316, with the logical identifier range [7, 7] and the virtual node "1101" (step S910). This is corresponded to 1325 of FIG. 14. Thereby, in the peer 1315, a processing (processing shown in FIG. 13) to search for the logical identifier range [7, 7] using the virtual node "1101" is performed.

In the peer 1315, a processing to search for the logical identifier range [8, 9] (1407 of FIG. 15) using the virtual node "1100", a processing to search for the logical identifier range [10, 11] (1406 of FIG. 15) using the virtual node "1101" and a processing to search for the logical identifier range [7, 7] (1405 of FIG. 15) using the virtual node "1101" are performed.

In case of any of the processings, the range dividing means 815 of the peer 1315 divides with the logical identifier 13 ("1101") of the Successor of the peer 1315 as a boundary value (step S901). Here, only the logical identifier range [10, 11] is divided into a logical identifier range [10, 10] (1410 of FIG. 15) and a logical identifier range [11, 11] (1409 of FIG. 15). In step S903, the message transferring means 813 of the peer 1315 requires the peer 1316 being the Successor to acquire the data in this range [11, 11] from the local data storage 811.

After this division, the left bit range division is carried out by the left bit shift range dividing means 816 for each of the other logical identifiers, such as the logical identifier range [7, 7] (1405 of FIG. 10), the logical identifier range [8, 9] (1407 of FIG. 15) and the logical identifier range [10, 10] (1410 of FIG. 15).

That is, the logical identifier range [7, 7] (1405 of FIG. 15) is converted into the logical identifier range [7, 7] (1408 of FIG. 15). The logical identifier range [8, 9] (1407 of FIG. 15) is divided into a logical identifier range [8, 8] (1412 of FIG. 15) and a logical identifier range [9, 9] (1411 of FIG. 15). The logical identifier range [10, 10] (1410 of FIG. 15] is converted into the logical identifier range [10, 10] (1413 of FIG. 15).

These logical identifier ranges are transferred to a peer 1312 which is the d node (predecessor) of the peer 1315 in step S908 and step S910. That is, a message to require searching for the logical identifier range [7, 7] using the virtual node "1011" is transferred to the peer 1312 (1329 of FIG. 14), a message to require searching for the logical identifier range [8, 8] using the virtual node "1000" is transferred to the peer 1312, a message to require searching for the logical identifier range [9, 9] using the virtual node "1001" is transferred to the peer 1312, and a message to require searching for the logical identifier range [10, 10] using the virtual node "1010" is transferred to peer 1312.

In the peer 1312, because any ranges are not included between the logical identifier 3 (binary indication "0011") of the peer 1312 and the logical identifier 6 (binary indication "0110") of its Successor, and similarly, the virtual node is not included (No of step S905). Thereby, all of them are transferred to a peer 1313 being the Successor in step S911 (1330-1333 of FIG. 14).

The peer 1313 instructs a peer 1314 to search for this range from the local data storage 811 and return the search result to the peer 1316 being the searcher because the logical identifier range [7, 7] (1333 of FIG. 15), the logical identifier range [8, 8] (1332 of FIG. 15) and the logical identifier range [9, 9] (1331 of FIG. 15) are included between the logical identifier 6 (binary indication "0110") of the peer 1313 and the logical identifier 9 (binary indication "1001") of the peer 1314 which is the Successor of this peer 1313 (step S903). As for the remained range [10, 10] (1330 of FIG. 10), because its virtual node does not exist between the own peer and the Successor, the peer 1313 transfers the logical identifier range [10, 10] to the peer 1314 being the Successor in step S911 (1334 of FIG. 14).

The peer 1314 instructs the peer 1315 to search for this range [10, 10] from the local data storage 811 and return the search result to the peer 1316 which is the searcher because the logical identifier range [10, 10] (1334 of FIG. 15) is included between the logical identifier 9 (binary indication "1001") of the peer 1314 and the logical identifier 10 (binary indication "1010") of the peer 1315 which is the Successor of this peer 1314 (step S903).

As described above, the search results of all the logical identifier range idRanges ([7, 11]) is returned to the peer 1316 (step S1006). Then the registration/search executing means 817 of the peer 1316 provides the searcher with the result list Results that stores the search results transmitted from other peer (step S1008).

As described above, in the second exemplary embodiment, a set which matches a search formula is converted into a range in a logical identifier space. Then a search message and a logical identifier range are divided so that a search message is passed to a peer which is in charge of a logical identifier belonging to the logical identifier range. At this time, the logical identifier range is bit-shifted to the left and divided base on the difference in the first bit. By adopting such a technique, a range search on an overlay network can be implemented, achieving a constant degree and a logarithmic hop count in a similar way to the range search on the de Bruijn graph.

Third Exemplary Embodiment

According to the second exemplary embodiment, while a logical identifier (ID) on the de Bruijin is assumed as a virtual ID on the Chord hash space, a new virtual ID is generated and a logical identifier range is divided based on the difference in the first bit of the logical identifier range. However, the number of the bits and the number of virtual IDs to be managed increase when a huge hash space (ID space) is employed. Thus, in the third exemplary embodiment, by managing a plurality of virtual ID as a set, namely, as a virtual range (virtual logical identifier range), a data amount which a peer treats is reduced.

FIG. 16 is a block diagram which shows a configuration of a data search system according to the third exemplary embodiment. As shown in FIG. 16, the data search system according to the third exemplary embodiment includes a plurality of peers 2010, 2020 and 2030 having an address on a network 2000. FIG. 16 shows the only peers 2010, 2020 and 2030, which are connected to the network 2000 but a plurality of other peers are also connected to the network 2000. Each peer is embodied by a computer (a CPU; a processor; a data processing unit), such as a server that operates controlled by a program, (a hardware configuration of the computer is similar to that shown in FIG. 6). Note that, in this embodiment, a peer is the same as a node.

As shown in FIG. 16, the peer 2010 includes a peer logical identifier storage 2018, a local data storage 2011, a routing table 2012, message transferring means 2013, communication means 2014, search range left bit shift means 2015, range dividing means A2016, range dividing means B2017, registration/search executing means 2019. Note that, the other peers 2020 and 2030 have the same configuration as the peer 2010.

The storages (local data storage 2011, routing table 2012, peer logical identifier storage 2018) which compose the peer 2010 has the same configuration as that of the second exemplary embodiment and detailed explanation will be omitted.

The communication means 2014 and the registration/search executing means 2019 which compose the peer 2010 has the same configuration as that of the second exemplary embodiment and detailed explanation will be omitted.

The search range left bit shift means 2015, the range dividing means A2016 and the range dividing means B2017 which compose the peer 2010 generally operate as follows.

In the above means, a search target is defined as a search range. The search range includes a virtual range, a logical identifier range and the number of shifts. In this way, according to the third exemplary embodiment, a virtual node is treated as a set, while it is treated individually in the second exemplary embodiment, and thus, the amount of data to handle is reduced.

The search range left bit shift means 2015 increases the number of shifts, and updates an upper limit and a lower limit of a virtual range. The upper limit of the virtual range can be updated by bit-shifting the upper limit of the virtual range to the left, extracting the first bit of the upper or lower limit of the logical identifier range, and assigning the extracted bit to a lower bit. A processing that the search range left bit shift means 2015 performs will be described later.

The range dividing means A2016 divides the virtual range in the search range based on whether to belong to a given range. On this occasion, the logical identifier range in the search range is also divided. A processing that range dividing means A2016 performs will be described later.

The range dividing means B2017 divides the logical identifier range in the search range based on whether to belong to the given range. On this occasion, the virtual identifier range in the search range is also divided. A processing that range dividing means B2017 performs will be described later.

Next, an operation of the data search system according to, the third exemplary embodiment will be described below.

The whole operation of the data search system according to the third exemplary embodiment is generally similar to that of the data search system according to the second exemplary embodiment (FIG. 7). However, in the third exemplary embodiment, a method to search for a logical identifier range in a peer m is different. That is, in the third exemplary embodiment, a processing of "searching for a search range set qRanges in a peer m" shown in FIG. 17 is performed instead of the processing of "searching for a logical identifier range idRanges in a peer m using a virtual node i" in step S1004 FIG. 12. Note that, in the third exemplary embodiment, "initialization of a search range (including a virtual range and a logical identifier range)" is performed instead of initializing a virtual node (step S1003 of FIG. 12) in FIG. 12.

FIG. 17 is a flow chart which shows the data search procedure of the third exemplary embodiment. In the peer m, the message transferring means 2013 initializes a found search range set foundRanges, a not-found search range set NotFoundRanges, a peer d transferring search range set dRanges and a peer s transferring search range set sRanges when receiving a request to search for a search range set qRanges from the registration/search executing means 2019 (step S1601).

The message transferring means 2013 passes to the range dividing means B2017, each search range qRange in the search range set qRanges with the logical identifier range (m, s], which is a range between the peer m and the peer s (Successor), and step S1603 is repeated for each search range qRange (step S1602).

The range dividing means B2017 divides the search range qRange into an inside search range inRange and an outside search range outRange based on the logical identifier range in the range (m, s] between the logical identifier of the peer m and the logical identifier of the peer s (step 1603). The range dividing means B2017 returns the inside search range inRange and the outside search range outRange to the message transferring means 2013.

The message transferring means 2013 sequentially acquires from the range dividing means B2017, each inside search range inRange which is corresponded to each search range qRange, and sequentially acquires from the range dividing means B2017, each outside search range outRange which is corresponded to each search range qRange. An inside search range set inRangeSet is a set of the inside search range inRange. An outside search range set outRanges is a set of the outside search range outRange.

The message transferring means 2013 obtains the inside search range set inRangeSet and the outside search range set outRanges, which are corresponded to the search range qRange in the search range set qRanges, and adds (stores) in the found search range set foundRanges and the not-found search range set NotFoundRanges, respectively, (step S1604).

Then, the message transferring means 2013 passes to the range dividing means A2016, the not-found search range NotFoundRange in the not-found search range set NotFoundRanges and the range (m, s], which is between the logical identifier of the peer m and the logical identifier of the peer s. Then step S1606 is repeated for each not-found search range NotFoundRange (step S1605).

The range dividing means A2016 divides the not-found search range NotFoudRange into an inside search range inRange and an outside search range outRange based on the virtual range in the range (m, s] between the logical identifier of the peer m and the logical identifier of the peer s (step S1606). The range dividing means A2016 returns the inside search range inRange and the outside search range outRange to the message transferring means 2013.

The message transferring means 2013 sequentially acquires from the range dividing means A2016, each inside search range inRange which is corresponded to each not-found search range NotFoundRange, and sequentially acquires from the range dividing means A2016, each outside search range outRange which is corresponded to each not-found search range NotFoundRange. An inside search range set inRanges is a set of the inside search range inRange. An outside search range set outRanges is a set of the outside search range outRange.

Then, the message transferring means 2013 sequentially passes the inRange which is an element in the inside search range set inRanges to the search range left bit shift means 2015, and step S1608 is repeated (step S1607).

The search range left bit shift means 2015 bit-shirts the inside search range inRange to the left (step S1608) and returns the inside search range which has been bit-shifted to the left to the message transferring means 2013.

The message transferring means 2013 adds (stores) the inside search range set inRanges and the outside search range set outRanges into the peer d transferring search range set dRanges and the peer s transferring search range set sRanges, respectively, (step S1609).

Then, the message transferring means 2013 has the range foundRanges searched for from local data in the peer s (step S1611) if the number of elements in the found search range set foundRanges is not zero (N of step S1610).

Also, the message transferring means 2013 has the dRanges searched for in the peer d (step S1613) if the number of elements in the peer d transferring search range set dRanges is not zero (N of step S1612). Similarly, if the number of elements in the peer s transferring search range set sRanges is not zero (N of step S1614), the message transferring means 2013 has the sRanges searched for in the peer s (step S1615). Then the processing terminates.

Then a processing (step S1603) that the range dividing means B2017 performs will be described below. FIG. 18 is a flow chart which shows a processing that the range dividing means A of the third exemplary embodiment performs. Note that, the search range qRange includes the virtual search range iRange, the logical identifier range kRange and the number of shifts c.

First, the range dividing means B2017 stores in an inside virtual range set inKeyRanges, a range included in the Range (range between the logical identifier of the own peer and the logical identifier of the Successor) within the search range qRange, and stores a range which is not included in the Range in an outside virtual range set outKeyRanges (step S1801). The range dividing means B2017 initializes the inside search range set inQranges and the outside search range set outQRanges (step S1802).

Then the range dividing means B2017 repeats steps S1804 to S1809 for each virtual range eachKeyRange in the inside virtual range set inKeyRanges and the outside virtual range set outKeyRanges range (step S1803).

The range dividing means B2017 sets the upper limit of a new virtual logical identifier range (maximum virtual logical identifier) NewImgRangeMax so that its upper bits are the first (the bit length–the number of shifts c) bits of the upper limit in the virtual range eachKeyRange and its lower bits are bit strings obtained by bit-shifting the upper limit of the logical identifier range kRange to the right by (the bit length–the number of shifts c) times (step S1604).

The range dividing means B2017 sets the lower limit of the new virtual logical identifier range (minimum virtual logical identifier) NewImgRangeMin so that its upper bits are the first (the bit length–the number of shifts c) bits of the lower limit in the virtual range eachKeyRange and its lower bits are bit strings obtained by bit-shifting the upper limit of the logical identifier range kRange to the right by (the bit length–the number of shifts c) times (step S1605).

The range dividing means B2017 generates a new virtual logical identifier range NewImgRange from the maximum virtual logical identifier NewImgRangeMax and the minimum virtual logical identifier NewImgRangeMin and generates a new search range NewQRange from the new virtual logical identifier range NewImgRange, the virtual range eachKeyRange and the number of shifts c, (step S1806).

Next, the range dividing means B2017 determines whether the virtual range eachKeyRange belongs to the inside virtual range set inKeyRanges (step S1807). When it is determined that the virtual range eachKeyRange belongs to the inside virtual range set inKeyRanges (Y of step S1807), the new search range NewQRange is registered in the inside search range set inQRanges (step S1808). On the other hand, When it is determined that the virtual range eachKeyRange does not belong to the inside virtual range set inKeyRanges (N of step S1807), the new search range NewQRange is registered in the outside search range set outKeyRanges (step S1809).

Then, the range dividing means B2017 returns the inside search range set inQRanges and the outside search range set outQRanges to the message transferring means 2013 (step S1810). The inside search range set inQRanges is acquired by the message transferring means 2013 as the inside search range set inRangeSet, and the outside search range set outQRanges is acquired by the message transferring means 2013 as the outside search range set outRanges.

Next, a processing that the range dividing means A2016 performs (step S1606) will be described next. FIG. 19 is a flow chart which shows a processing that the range dividing means B of the third exemplary embodiment performs. Note that, a search range qRange includes a virtual search range iRange and a logical identifier range kRange and the number of shifts c.

First, the range dividing means A2016 stores in the inside virtual range set inImgRanges, a range included in the Range (range between the logical identifier of the own peer and the logical identifier of the Successor) in the search range qRange, and stores in the outside virtual range set outImgRanges, a range which is not included in the Range (step S1701). The range dividing means A2016 initializes the inside search range set inQranges and the outside search range set outQRanges (step S1702).

The range dividing means A2016 repeats steps S1704-S1709 for each virtual range eachImgRange in the inside virtual range set inImgRanges and the outside virtual range set outImgRanges (step S1703).

The range dividing means A2016 bit-shifts the upper limit of the virtual range eachImgRange to the left by (the bit length–the number of shifts c) times and sets the lower (the bit length–the number of shifts c) bits to 1. Then the range dividing means A2016 compares this bit strings with the upper limit of the logical identifier range kRange, and sets the smaller one as the upper limit (maximum logical identifier) NewRangeMax of a new logical identifier range (step S1704).

The range dividing means A2016 bit-shifts the lower limit of the virtual range eachImgRange to the left by (the bit length–the number of shifts c) times and sets the lower (the bit length–the number of shifts c) bits to zero. Then the range dividing means A2016 compares this bit strings with the lower limit of the logical identifier range kRange, and sets the bigger one as the lower limit (minimum logical identifier) NewRangeMin of a new logical identifier range (step S1705).

The range dividing means A2016 generates a new logical identifier range NewRange from the maximum logical identifier NewRangeMax and the minimum logical identifier NewRangeMin and generates a new search range NewQRange from the new logical identifier range NewRange, the virtual range eachImgRange and the number of shifts c (step S1706).

The range dividing means A2016 determines whether the virtual range eachImgRange belongs to the inside virtual range set inImgRanges (step S1707). When it is determined that the virtual range eachImgRange belongs to the inside virtual range set inImgRanges (Y of step S1707), the new search range NewQRange is registered in the inside search range set inQRanges (step S1708). On the other hand, when it is determined that the virtual range eachImgRange does not belong to the inside virtual range set inImgRanges (N of step S1707), the new search range NewQRange is registered in the outside search range set outQRanges (step S1709).

The range dividing means A2016 returns the inside search range set inQRanges and the outside search range set outQRanges to the message transferring means 2013 (step S1710). The inside search range set inQRanges is acquired by the message transferring means 2013 as the inside search range set inRanges, and the outside search range set outQRanges is acquired by the message transferring means 2013 as the outside search range set outRanges.

Next, a processing that the search range left bit shift means 2015 performs (step S1608) will be described. FIG. 20 is a flow chart which shows a processing that the search range left bit shift means of the third exemplary embodiment performs. Note that, the search range qRange includes the virtual search range iRange and the logical identifier range kRange and the number of shifts c.

First, the search range left bit shift means 2015 increases the number of shifts c (step S2101). The search range left bit shift means 2015 assigns to the upper limit iMax (maximum virtual logical identifier) of the virtual range iRange, bit strings obtained by bit-shifting to the left and giving the c-th bit from the top of the upper limit kMax (maximum logical identifier) of the logical identifier range kRange (step S2102) to lower bits. Next, the search range left bit shift means 2015 assigns to the upper limit iMax (maximum virtual logical identifier) of the virtual range iRange, bit strings obtained by bit-shifting to the left and giving the c-th bit from the top of the upper limit kMax (maximum logical identifier) of the logical identifier range kRange lower bits (step S2103). Then, the value after performing the above processing is returned to the message transferring means 2013.

Then an example of the operation of the data search system (example of the procedure of the data search processing) according to the third exemplary embodiment will be described with reference to FIG. 21.

FIG. 21 is an illustration which shows an example of the message flow between peers according to the third exemplary embodiment.

In FIG. 21, a plurality of peers participating in an overlay network are shown. It is assumed that a peer 1916 whose logical identifier is 13 executes $\{7 \leq \text{temperature} \leq 11\}$ as a search formula Query and the temperature being an attribute is corresponded to a logical identifier range. This example is similar to the example shown in FIG. 14.

In this case, the registration/search executing means 2019 of the peer 1916 calculates the corresponding logical identifier range idRanges from the search formula Query, and obtains the logical identifier range [7, 11]. Next, the registration/search executing means 2019 initializes the results list Results, activates a process to accept the result from another peer, and sets time-out to a timer (cf. steps S1001-S1003). Then the search range set qRanges (1920 of FIG. 21) is initialized.

In the initialization of the search range set, any arbitrary value is acceptable for the virtual logical identifier range (1920 of the middle columns of FIG. 21) as long as the logical identifier range idRange in the logical identifier range set idRanges derived from the search formula is set to the logical identifier range (1920 of the right column of FIG. 21) in the search range, and the number of shifts c (1920 of the left columns of FIG. 21) is 0. Preferably, the virtual logical identifier range belongs to a range which is more than the own logical identifier (13 in the example of FIG. 21) and equal to or less than the logical identifier of the successor (15 in the example of FIG. 21), and the upper limit of the virtual range has a lot of the first bits of the upper limit of the idRange in its lower bits and the lower limit of the virtual range has a lot of the first bits of the lower limit of the idRange in its lower bits. Here, the peer 1916 is initialized to two search ranges of a search range 1921 whose number of shifts is 2, virtual range is [14, 14] and logical identifier range is [8, 11], and a search range 1922 whose number of shifts is 1, virtual range is [14, 14] and logical identifier range is [7, 7].

In FIG. 21, the peer 1916 divides a range of the search ranges 1921 and 1922 based on the logical identifier ranges (right columns of the search ranges 1921 and 1922) using the range (13, 15] which is more than the logical identifier 13 of the peer 1916 and equal to or less than the logical identifier 15 of the successor (peer s) (step S1603). Because each logical identifier range is not included in (13, 15], these ranges are stored in the not-found search range set (step S1604).

Then the peer 1916 divides a range of the search ranges 1921 and 1922 included in the not-found search range set using a range (13, 15], which is more than the logical identifier 13 of the peer 1916 and equal to or less than the logical identifier 15 of the successor (peer s) based on the virtual range (step S1606). Because each virtual range is [14, 14] and is included in this range, each virtual range is stored in the inside search range set. The peer 1916 bit-shifts the search ranges in this set to the left (step S1608) and obtains search ranges 1923 and 1924 shown in FIG. 21. Then these ranges are stored in the d node transferring search range set (step S1609). Although the number of elements of the found search range set and the s node transferring search range set are 0 (Y of step S1610, Y of step S1614), the peer 1916 transfers this to the peer 1915 being the d node because the search ranges 1923 and 1924 are stored in the d node search range set (N of step S1612), and the search range set including the search ranges 1923 and 1924 is searched for in the peer 1915 (step S1613).

Then the peer 1915 searches for the search range set including the search ranges 1923 and 1924. The peer 1915 divides a range of the range (10, 13], which is more than the logical identifier 10 of the peer 1915 and equal to or less than the logical identifier 13 of the successor (peer s) based on the logical identifier range (step S1603). Because the logical identifier range of the search range 1923 is [8, 11], the search range 1925 including [11, 11] in its logical identifier is stored as the inside search range set, and the search range 1926 including [8, 10] in its logical identifier range and the search range 1924 whose logical identifier is [7, 7] are stored as the outside search range set. The search range 1925 is stored in the found search range set. The search ranges 1926 and 1924 are stored in the not-found search range set (step S1604).

Next, the peer 1915 divides a range of the search ranges 1926 and 1924 belonging to the not-found search range set, using the range (10, 13], which is more than the logical identifier 10 of the peer 1915 and equal to or less than the logical identifier 13 of the successor (peer s) based on the virtual range (step S1606). Because each virtual range is [12, 13] and [13, 13], these are stored in the inside search range set and bit-shifted to the left to be the search ranges 1926 and 1927 (step S1608). The peer 1915 instructs the peer 1916 being the successor (s node) to search locally for the search range 1925 stored in the found search range set (step S1611). Also, the search ranges 1926 and 1927 are transferred to the peer 1912 being the d node (step S1613).

Then the peer 1912 which accepts the search ranges 1926 and 1927 divides a range of the range (3, 6], which is more than the logical identifier 3 of the peer 1912 and equal to or less than the logical identifier 6 of the successor (peer s) based on the logical identifier range (step S1603). Because the logical identifier ranges of the search ranges 1926 and 1927 are [8, 11] and [11, 11] respectively, both are stored in the outside search range set. The same range is also divided based on the virtual range (step S1606) but, because the virtual ranges are [8, 10] and [7, 7], these ranges are stored in the s node transferring search range set (step S1609), and transferred to the peer 1913 being the s node (step S1615).

Then the peer 1913 which accepts the search ranges 1928 and 1927 divide a range of the range (6, 9], which is more than the logical identifier 6 of the peer 1913 and equal to or less than the logical identifier 9 of the successor (peer s) based on the logical identifier range (step S1603). Because the logical identifier range of the search range 1928 is [8, 10], it is divided into the search range 1930 whose logical identifier range is [10, 10] and the search range 1931 whose logical identifier range is [8, 9]. The search range 1930 is stored in the outside search range set and the search range 1931 is stored in the inside search range set. Because the logical identifier range of the search range 1929 is [11, 11], it is stored in the inside search range set. Because the search ranges 1931 and 1929 are stored in the found search range set (step S1604), the peer 1914 being the successor of the peer 1913 (peer s) searches locally for these ranges (step S1611). Also, the peer 1914 being the successor (peer s) is instructed to search for the search range 1931 (step S1615).

Then the peer 1914 which accepts the search range 1930 divides a range of the range (9, 10], which is more than the logical identifier 9 of the peer 1914 and equal to or less than the logical identifier 10 of the successor (peer s) based on the logical identifier range (step S1603). Because the search range 1930 is included in [9, 10], it is stored in the found search range set (step S1604), and searched locally for by the peer 1915 being the successor (step S1611).

As described above, in the third exemplary embodiment, a search message and a logical identifier range are divided so that a set corresponding to a search formula is converted into a range of a logical identifier space and the search message is passed to a peer whose logical identifier belongs to the logical identifier range. At this time, the logical identifier range of the search target is bit-shifted to the left or the number of shifts is increased, while an upper limit and a lower limit of a virtual range are bit-shifted to the left, and lower bits are set to the (the number of shifts)-th bit of the upper limit and the lower limit of the virtual range. By adopting this method, a range search on the overlay network can be implemented, achieving a constant degree and a logarithmic hop count similarly to the range search on the deBruijn graph. Furthermore, by managing a plurality of virtual IDs (virtual node) as a set (virtual logical identifier range), the amount of data which each peer on the overlay network handle can be reduced when the range search is performed.

According to the above second and third exemplary embodiments, the peer is embodied, for example, by a computer (terminal) such as a server or a personal computer. Also, in each peer, a control unit such as a CPU performs the processing described in the second and third exemplary embodiments according to a program (data search program) stored in the storage means such as a hard disk, so that each configuration unit (means) is implemented. Also, in each peer, a storage unit and a table are embodied by memory means such as a hard disk.

In the second and third exemplary embodiments, the processing to store data (for example, data stored in the local data storage 811 shown in FIGS. 11 and 16) in each peer (each node) is performed according to the algorithm of the Koorde.

The present invention is applicable to a relational database to share data in a wide area. It is also applicable to a wide area message notice service which allows accepting a notice when particular attribute data occurs. Particularly, it is applicable to store Radio Frequency Identifier (RFID) data, a log for a system operational management, an email and a Web page, and Social Network Service (SNS) data. As for a message notice system, it is available for a stock price notice system or a system to detect the change of the RFID data such as temperature.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention.

For example, as another aspect of the data search device to which the present invention is applied, it may be configured that a dividing unit performs a left bit shift range dividing processing that divides a logical identifier range into a plurality of logical identifier ranges such that first bits become the same in each of the logical identifier ranges, and bit-shifts the plurality of divided logical identifier ranges to the left if a division condition of the logical identifier range requested to search for is met. This configuration surely achieves a range search of data on a network.

As another aspect of the data search device to which the present invention is applied, it may be configured that the dividing unit compares a first bit of a lower limit with that of an upper limit in the logical identifier range, bit-shifts the logical identifier range to the left when the first bits are the same, and performs the left bit shift range dividing processing when the first bits are different. This configuration allows surely dividing a logical identifier range into a plurality of logical identifier ranges such that first bits become the same in each of the logical identifier ranges.

As another aspect of the data search device to which the present invention is applied, it may be configured that the device includes a range dividing unit that divides the logical identifier range requested to search for into two logical identifier ranges with the logical identifier of the successor as a border, wherein the dividing unit performs the left bit shift range dividing processing to a higher one of the two logical identifier ranges divided by the range dividing unit when a virtual node that is previously set is included between the own logical identifier and the logical identifier of the successor, and a search request transferring unit transfers the search request including the virtual node as well as the logical identifier range being the search target. This configuration allows surely performing a range search of data on an overlay network, achieving a constant degree and a logarithmic hop count.

As another aspect of the data search device to which the present invention is applied, it may be configured that the dividing unit includes a first dividing unit that divides the logical identifier range requested to search for into two logical identifier ranges in a specific range between the own logical identifier and the logical identifier of the successor based on the logical identifier range; a second dividing unit that divides a logical identifier range that is not included in the specific range of the logical identifier ranges divided by the first dividing unit, based on a virtual range that is previously set in the specific range; and a range left bit shift unit that bit-shifts to the left, a logical identifier range included in the specific range of the logical identifier ranges divided by the second dividing unit, and increases the number of shifts, wherein, the search request transferring unit transfers the search request including the virtual range and the number of shifts as well as the logical identifier range being the search target. This configuration allows surely reducing the amount of data each device on a network handles when a range search is performed, in addition to performing the range search on the overlay network, achieving a constant degree and a logarithmic hop count.

As another aspect of the data search method to which the present invention is applied, it may be configured that a dividing step performs a left bit shift range dividing processing that divides a logical identifier range into a plurality of logical identifier ranges such that first bits become the same in each of the logical identifier ranges, and bit-shifts the plurality of divided logical identifier ranges to the left if a division condition of the logical identifier range requested to search for is met. This configuration surely achieves a range search of data on a network.

As another aspect of the data search method to which the present invention is applied, it may be configured that, in the dividing step, a first bit of a lower limit is compared with that of an upper limit in the logical identifier range, the logical identifier range is bit-shifted to the left when the first bits are the same, and the left bit shift range dividing processing is performed when the first bits are different. This configuration allows surely dividing a logical identifier range into a plurality of logical identifier ranges such that first bits become the same in each of the logical identifier ranges.

As another aspect of the data search method to which the present invention is applied, it may be configured that the method includes a range dividing step of dividing the logical identifier range requested to search for into two logical identifier ranges with the logical identifier of the successor as a border, wherein, in the dividing step, the left bit shift range dividing processing is performed to a higher one of the two logical identifier ranges divided by the range dividing step when a virtual node that is previously set is included between the own logical identifier and the logical identifier of the successor, and in a search request transferring step, the search request including the virtual node as well as the logical identifier range being the search target is transferred. This configuration allows surely performing a range search of data on an overlay network, achieving a constant degree and a logarithmic hop count.

As another aspect of the data search method to which the present invention is applied, it may be configured that the dividing step includes: a first dividing step of dividing the logical identifier range requested to search for into two logical identifier ranges in a specific range between the own logical identifier and the logical identifier of the successor based on the logical identifier range; a second dividing step of dividing a logical identifier range that is not included in the specific range of the logical identifier ranges divided by the first dividing step, based on a virtual range that is previously set in the specific range; and a range left bit shift step of bit-shifting to the left, a logical identifier range included in the specific range of the logical identifier ranges divided by the second dividing step, and increasing the number of shifts, wherein, in the search request transferring step, the search request including the virtual range and the number of shifts as well as the logical identifier range being the search target is transferred. This configuration allows surely reducing the amount of data each device on a network handles when a range search is performed, in addition to performing the range search on the overlay network, achieving a constant degree and a logarithmic hop count.

As another aspect of the data search program to which the present invention is applied, it may be configured that a dividing processing performs a left bit shift range dividing processing that divides a logical identifier range into a plurality of logical identifier ranges such that first bits become the same in each of the logical identifier ranges, and bit-shifts the plurality of divided logical identifier ranges to the left if a division condition of the logical identifier range requested to search for is met. This configuration surely achieves a range search of data on a network.

As another aspect of the data search program to which the present invention is applied, it may be configured that, in the dividing processing, a first bit of a lower limit is compared with that of an upper limit in the logical identifier range, the logical identifier range is bit-shifted to the left when the first bits are the same, and the left bit shift range dividing processing is performed when the first bits are different. This configuration allows surely dividing a logical identifier range into a plurality of logical identifier ranges such that first bits become the same in each of the logical identifier ranges.

As another aspect of the data search program to which the present invention is applied, it may be configured that the program executes a range dividing processing of dividing the logical identifier range requested to search for into two logical identifier ranges with the logical identifier of the successor as a border, wherein, in the dividing processing, the left bit shift range dividing processing is performed to a higher one of the two logical identifier ranges divided by the range dividing processing when a virtual node that is previously set is included between the own logical identifier and the logical identifier of the successor, and in a search request transferring processing, the search request including the virtual node as well as the logical identifier range being the search target is transferred. This configuration allows surely performing a range search of data on an overlay network, achieving a constant degree and a logarithmic hop count.

As another aspect of the data search program to which the present invention is applied, it may be configured that the dividing processing includes: a first dividing processing of dividing the logical identifier range requested to search for into two logical identifier ranges in a specific range between the own logical identifier and the logical identifier of the successor based on the logical identifier range; a second dividing processing of dividing a logical identifier range that is not included in the specific range of the logical identifier ranges divided by the first dividing processing, based on a virtual range that is previously set in the specific range; and a range left bit shift processing of bit-shifting to the left, a logical identifier range included in the specific range of the logical identifier ranges divided by the second dividing processing, and increasing the number of shifts, wherein, in the search request transferring processing, the search request including the virtual range and the number of shifts as well as the logical identifier range being the search target is transferred. This configuration allows surely reducing the amount of data each device on a network handles when a range search is performed, in addition to performing the range search on the overlay network, achieving a constant degree and a logarithmic hop count.

This application is based upon and claims the benefit of priority from Japanese patent application No. 2007-106446, filed on Apr. 13, 2007, the disclosure of which is incorporated herein in its entirety by reference.

Figure 1:
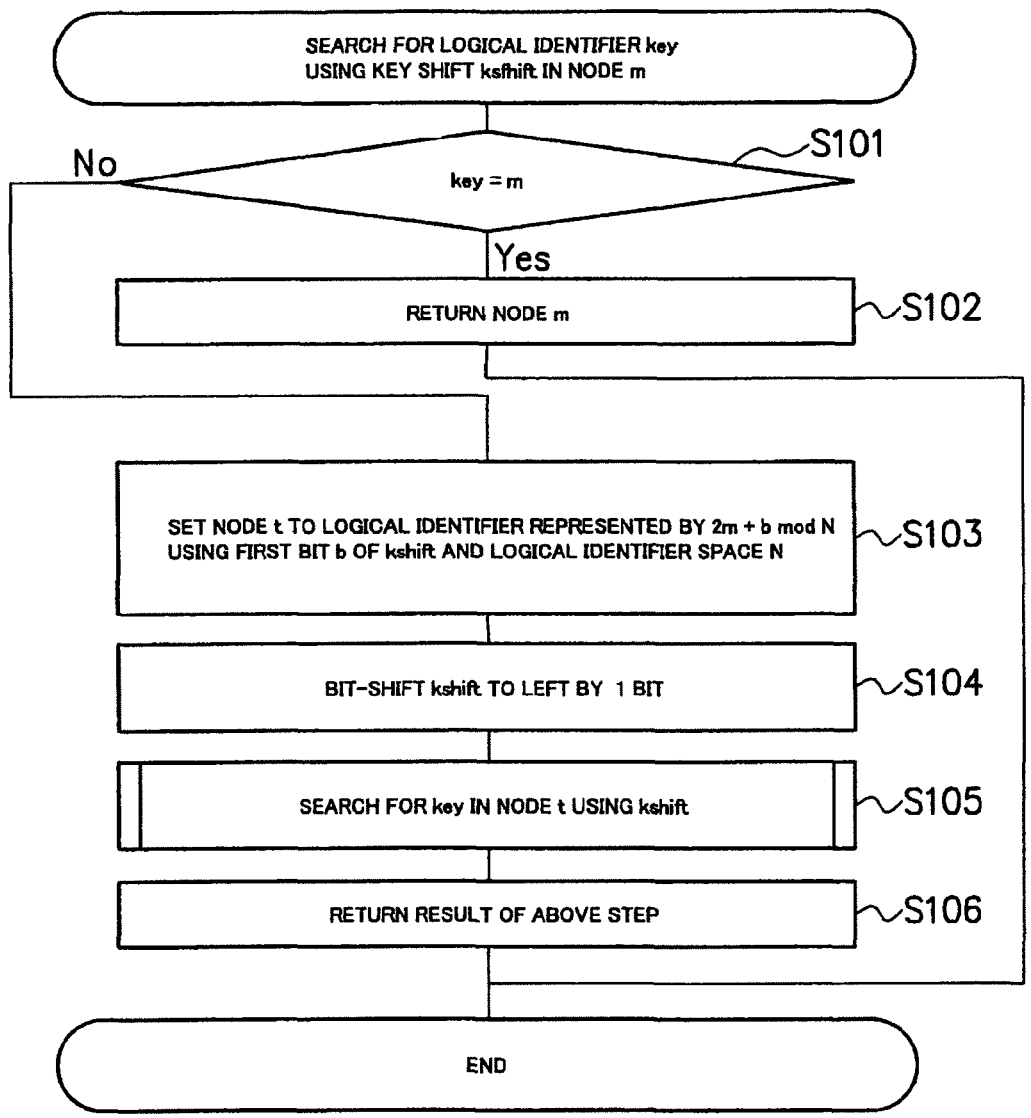
FIG. 1 is a flow chart which shows a data search procedure in a first related art.
Figure 2:
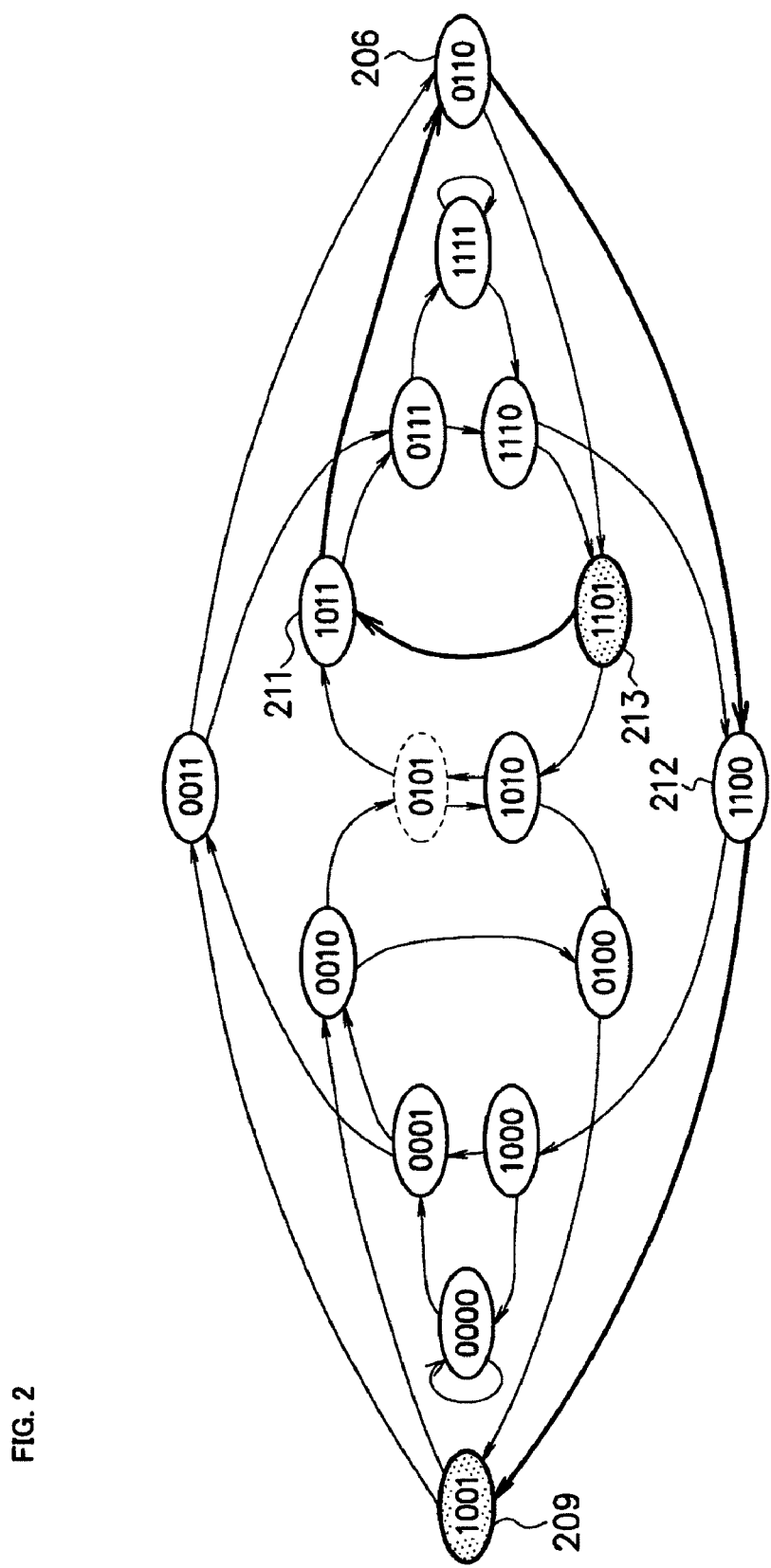
FIG. 2 is an illustration which shows a de Bruijn graph.
Figure 3:
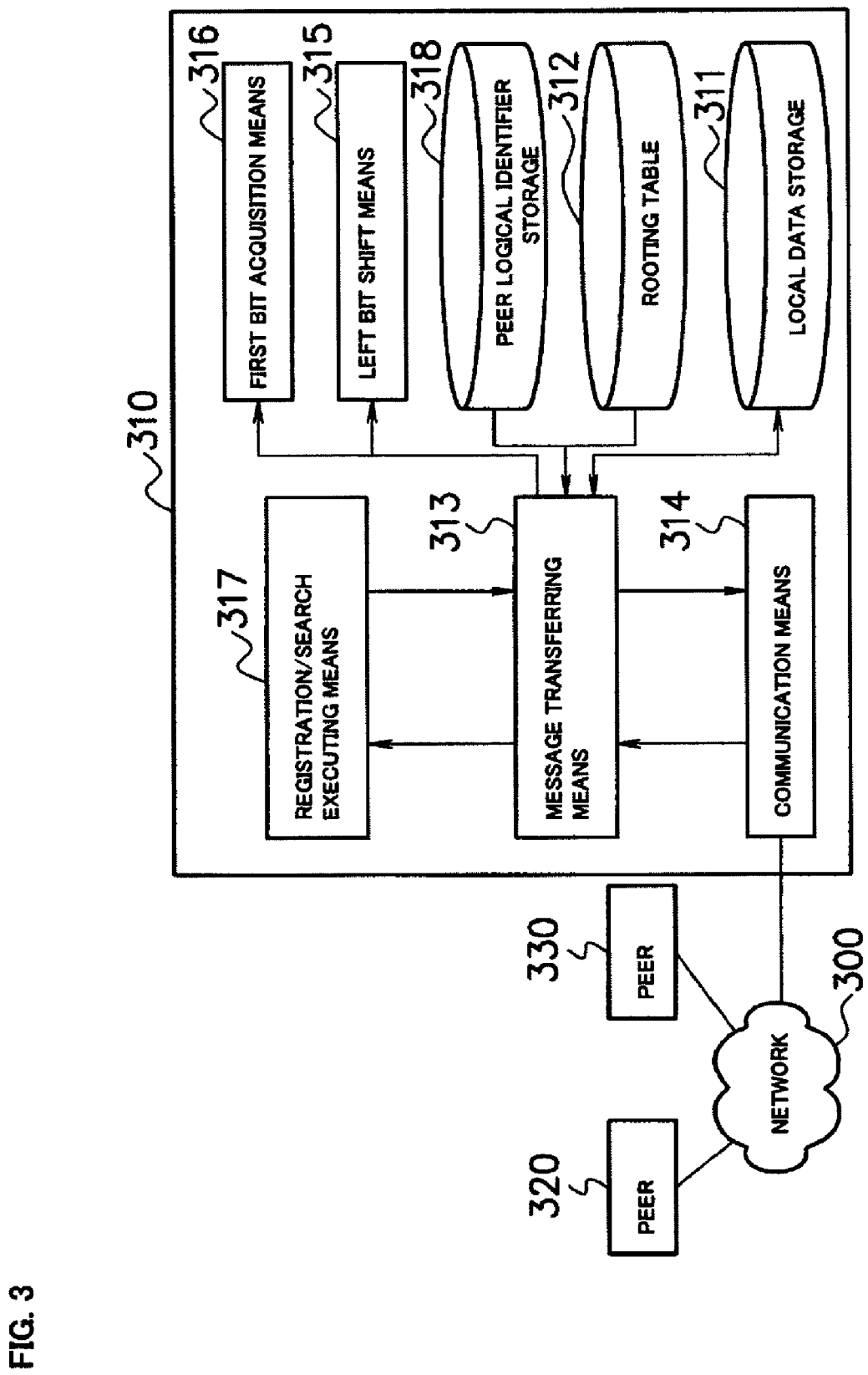
FIG. 3 is a block diagram which shows a system configuration of a second related art.
Figure 4:
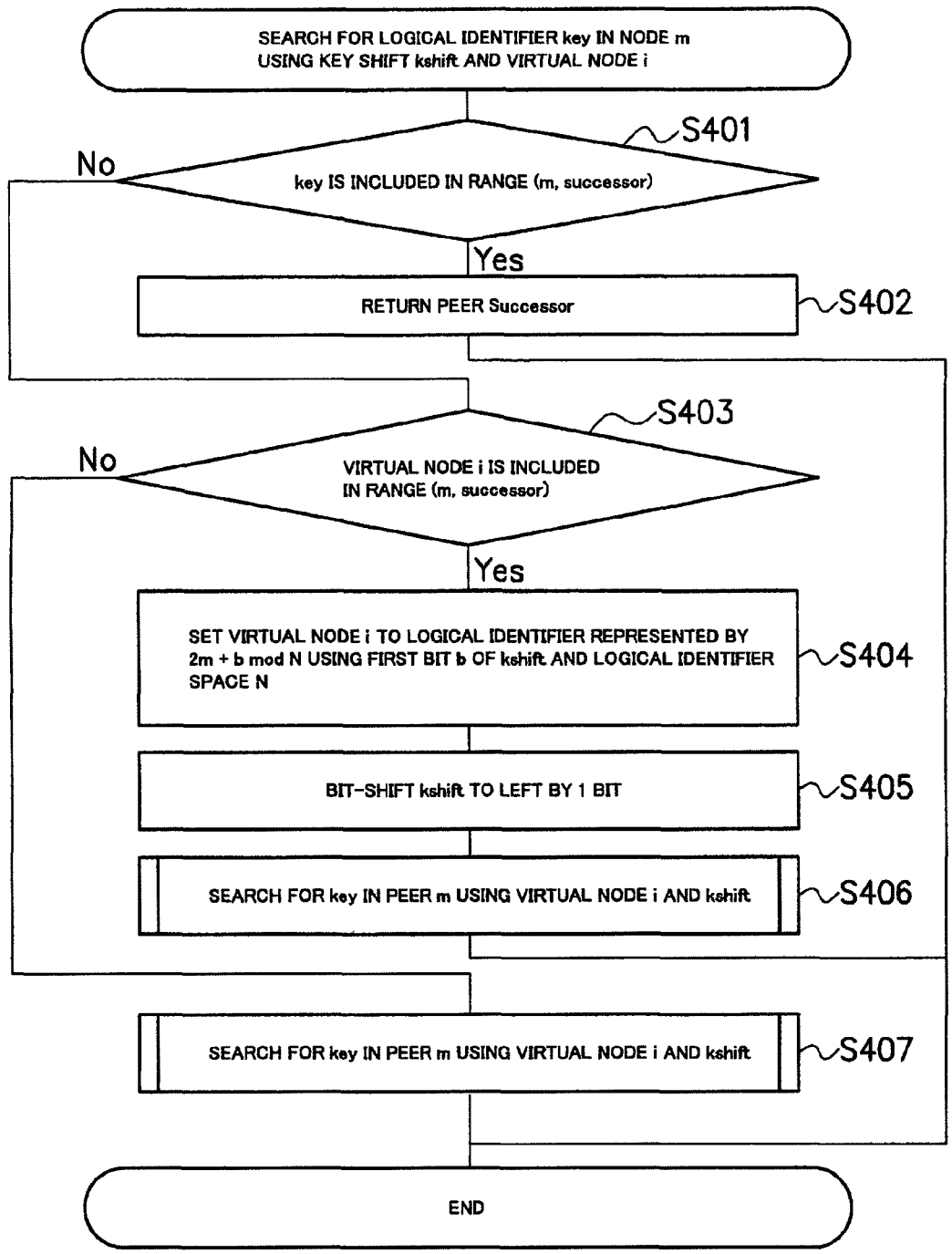
FIG. 4 is a flow chart which shows a data search procedure in the second related art.
Figure 5:
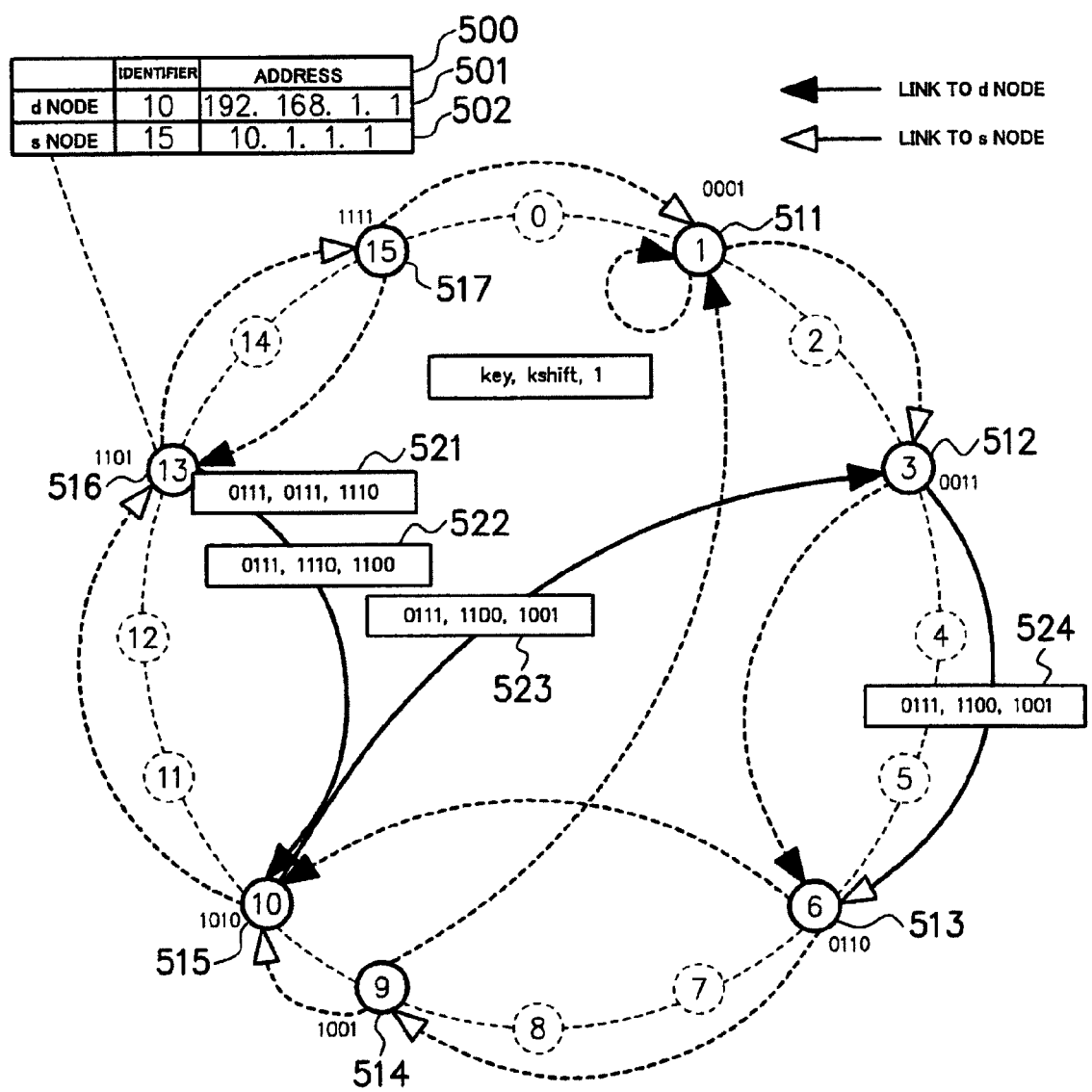
FIG. 5 is an illustration which shows an example of a message flow between peers in the second related art.
Figure 6:
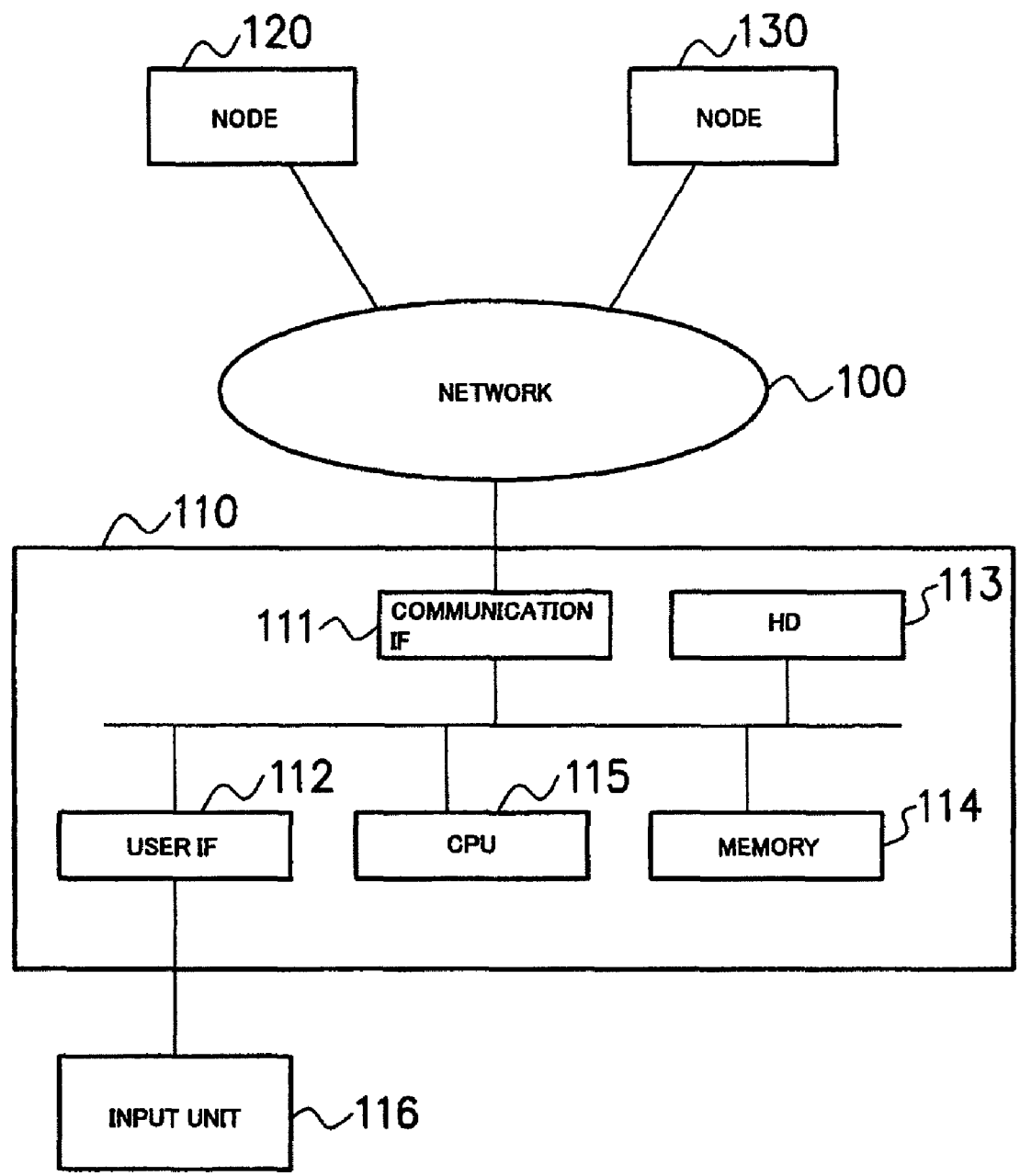
FIG. 6 is a block diagram which shows a configuration of a data search system according to a first exemplary embodiment of the present invention.
Figure 7:
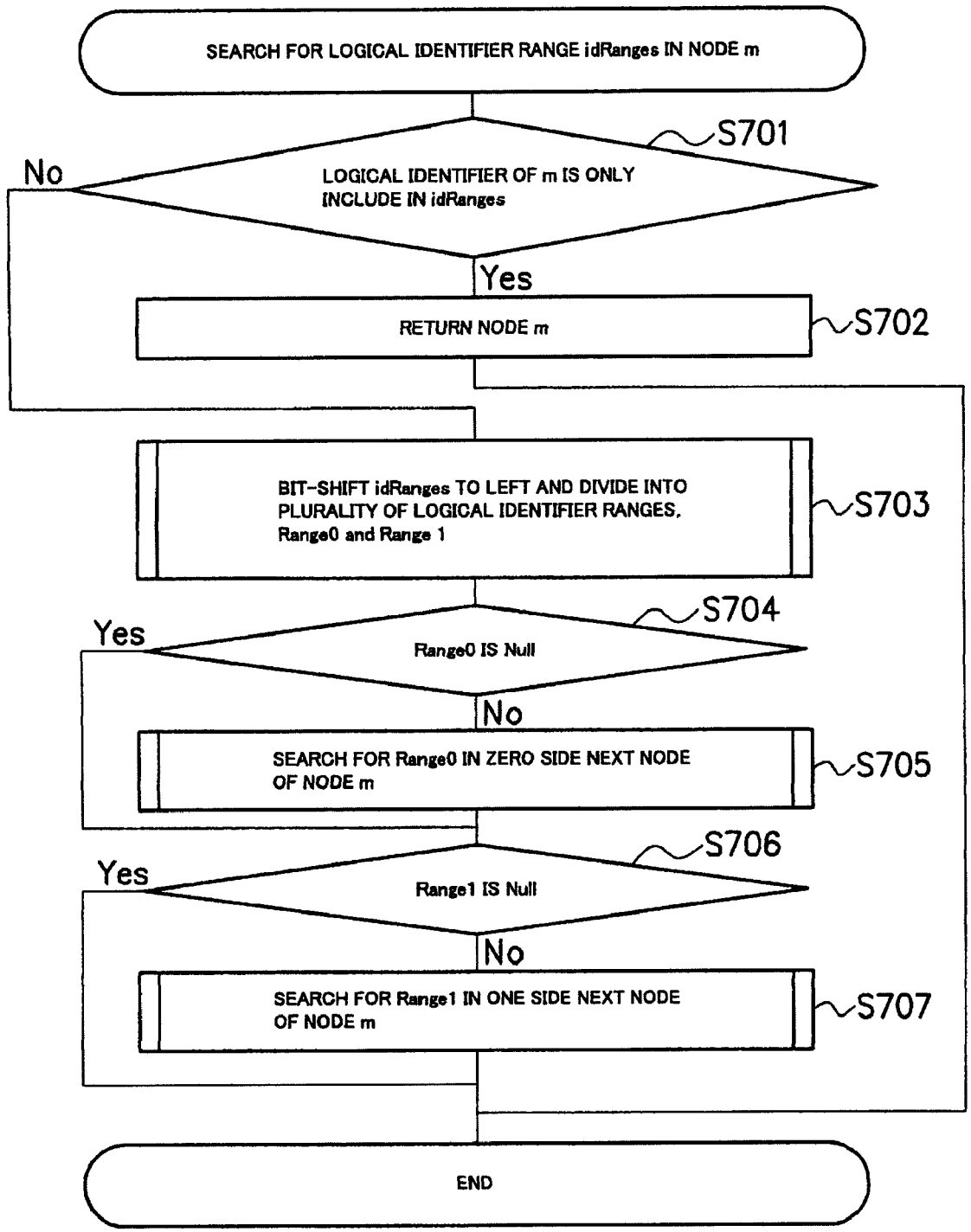
FIG. 7 is a flow chart which shows a data search procedure according to the first exemplary embodiment of the present invention.
Figure 8:
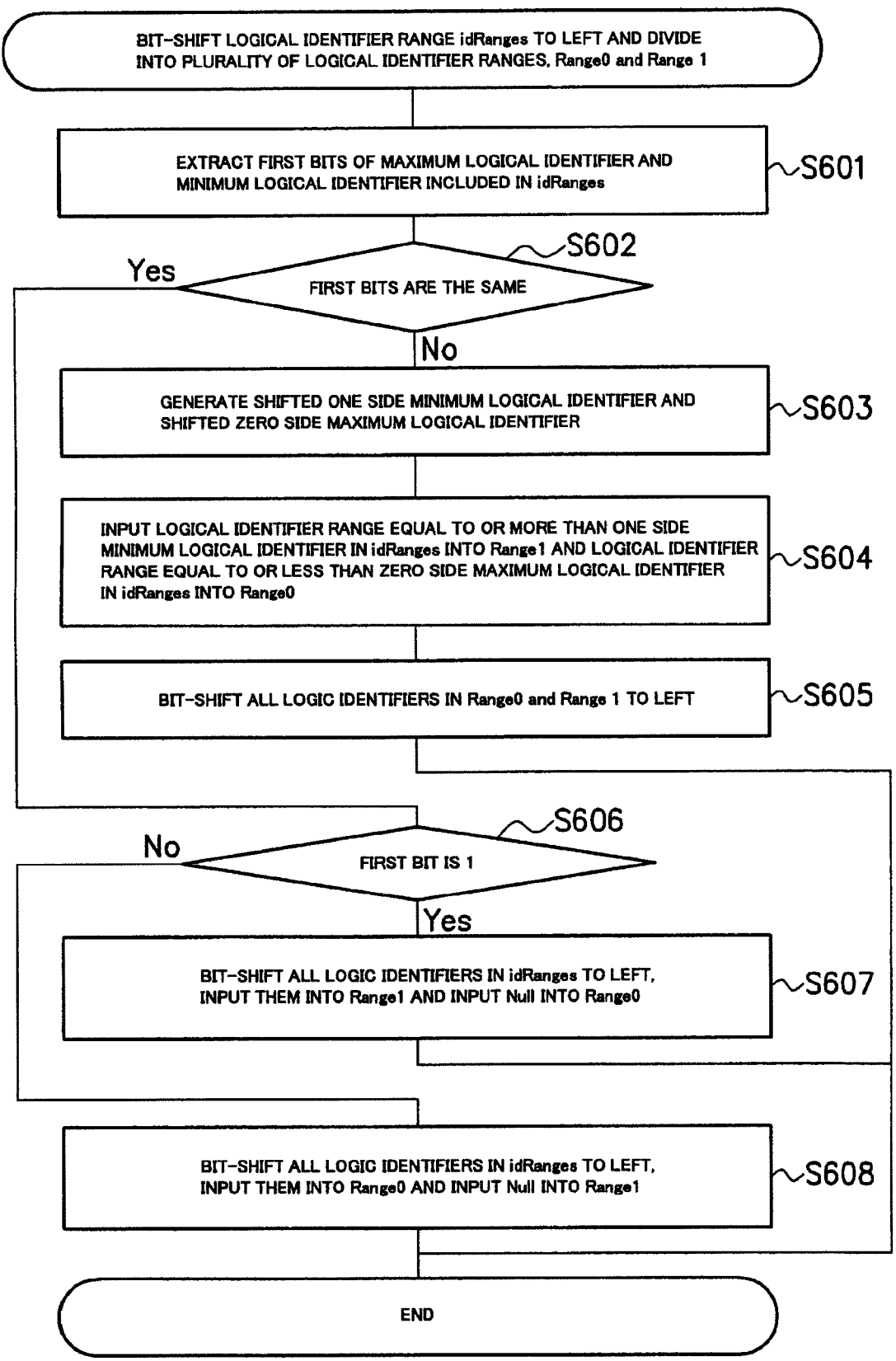
FIG. 8 is a flow chart which shows a procedure of a left bit shift range dividing processing according to the first exemplary embodiment of the present invention.
Figure 9:
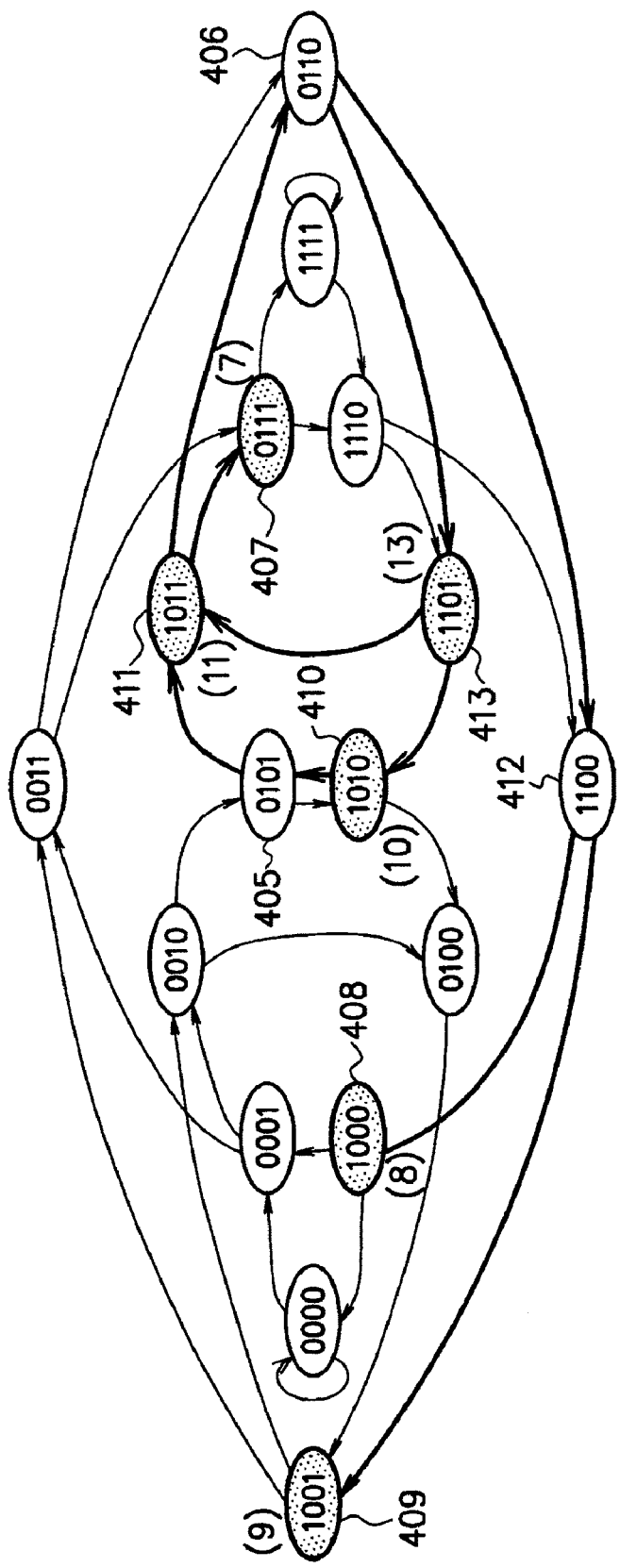
FIG. 9 is an illustration which shows the de Bruijn graph according to the first exemplary embodiment of the present invention.
Figure 10:
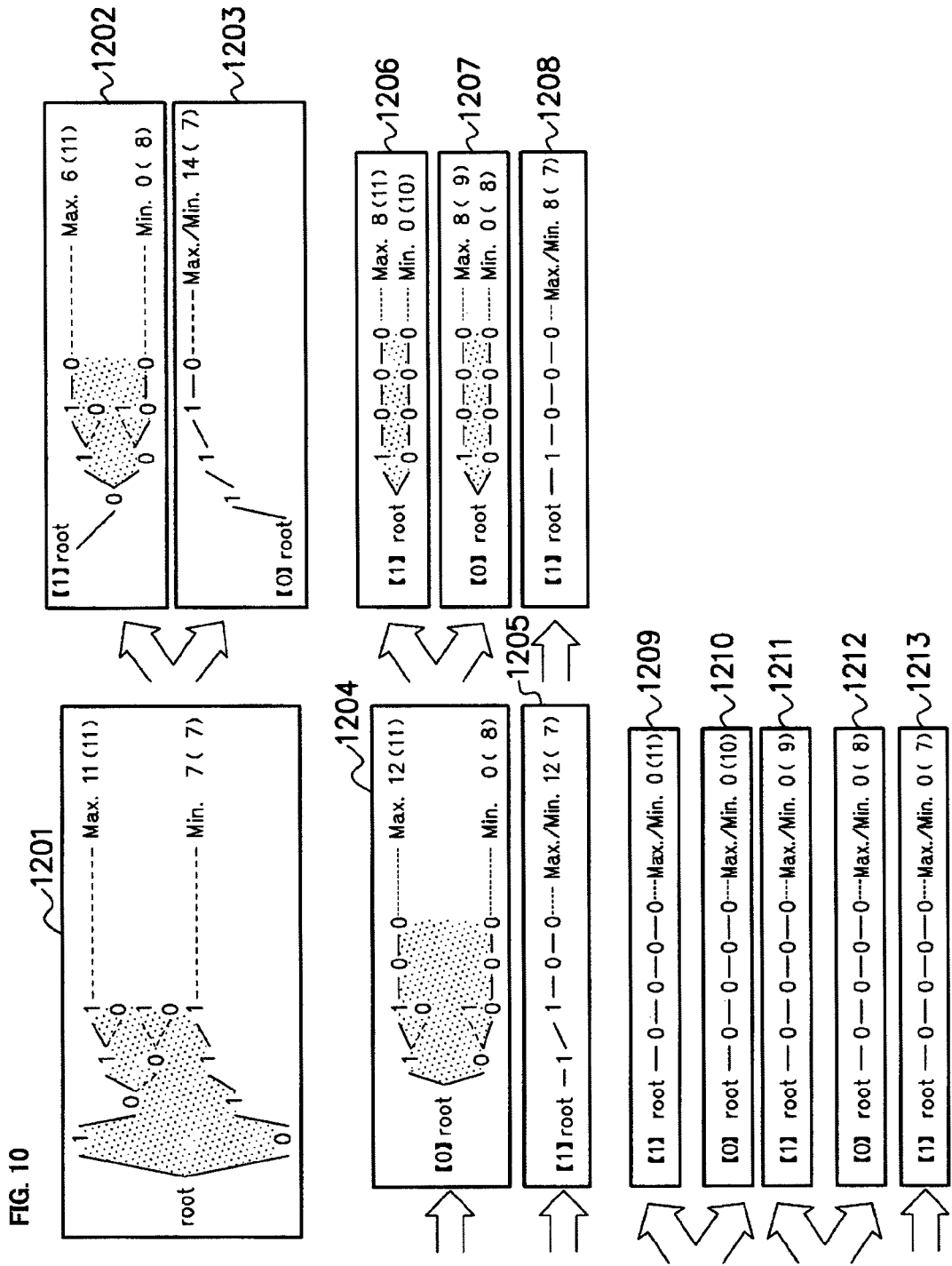
FIG. 10 is an illustration showing an algorithm of the left bit shift range division according to the first exemplary embodiment of the present invention.
Figure 11:
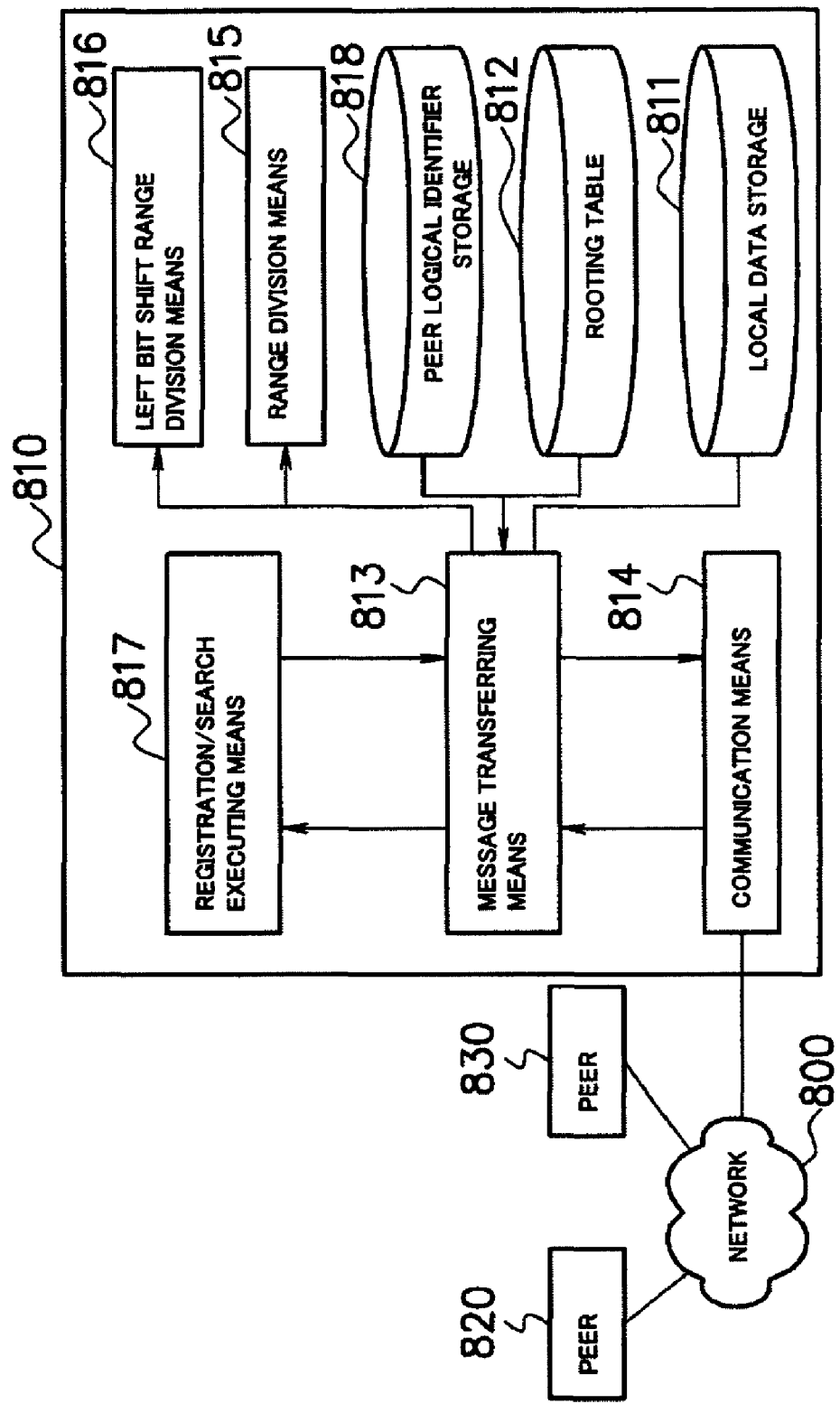
FIG. 11 is a block diagram which shows a configuration of a data search system according to a second embodiment of the present invention.
Figure 12:
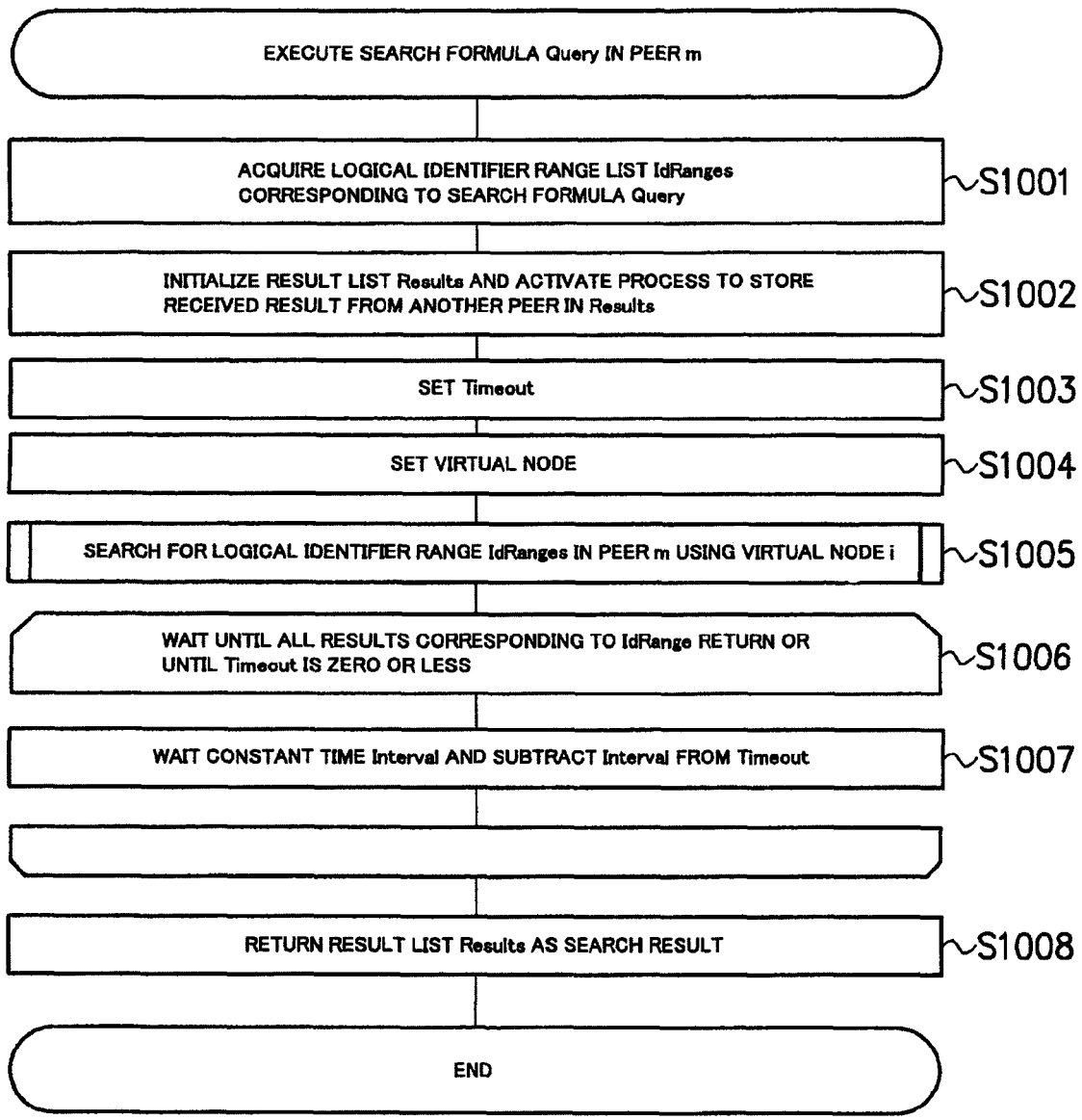
FIG. 12 is a flow chart which shows a whole operation of the data search system according to the second exemplary embodiment of the present invention.
Figure 13:
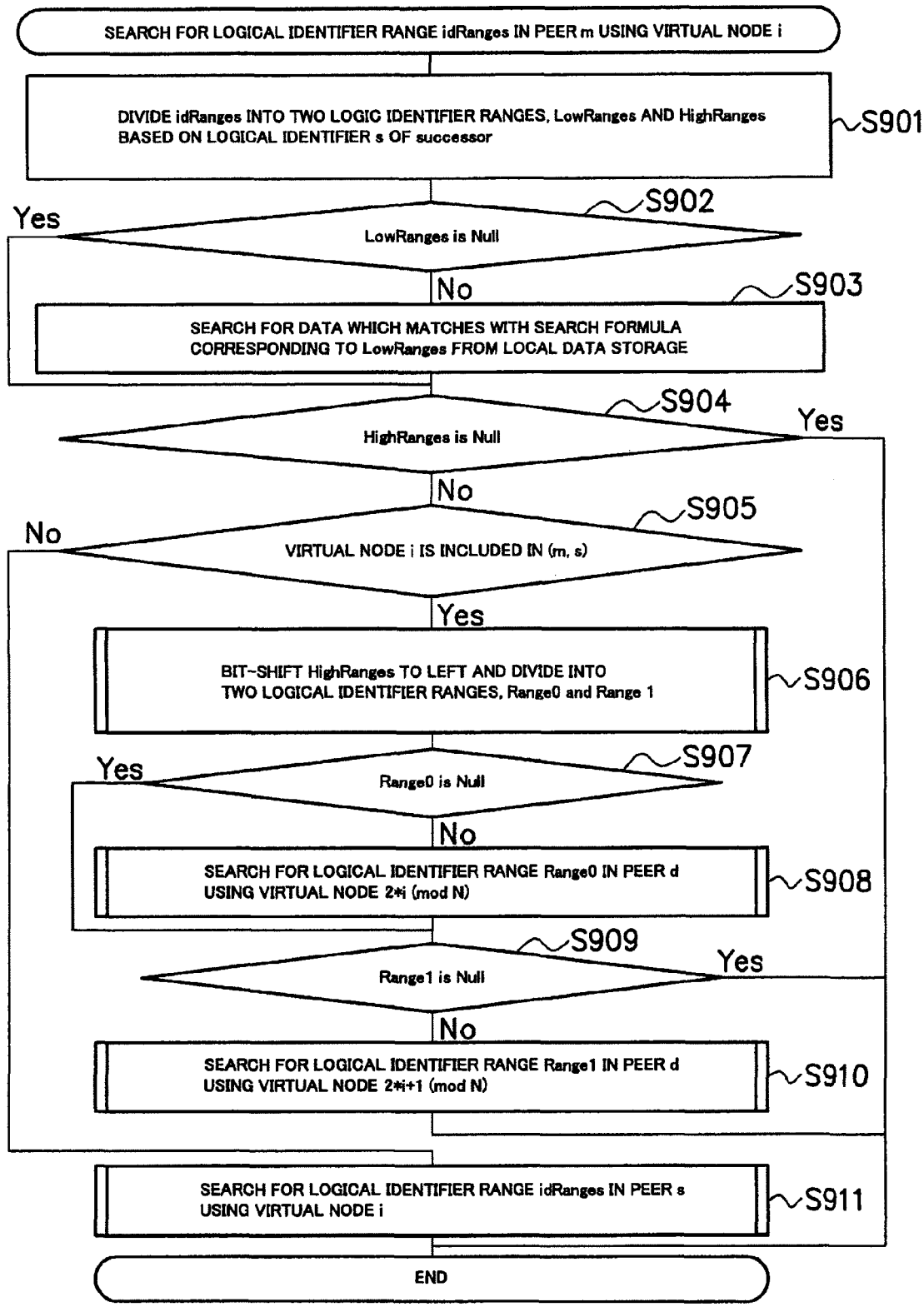
FIG. 13 is a flow chart which shows a data search procedure according to the second exemplary embodiment of the present invention.
Figure 14:
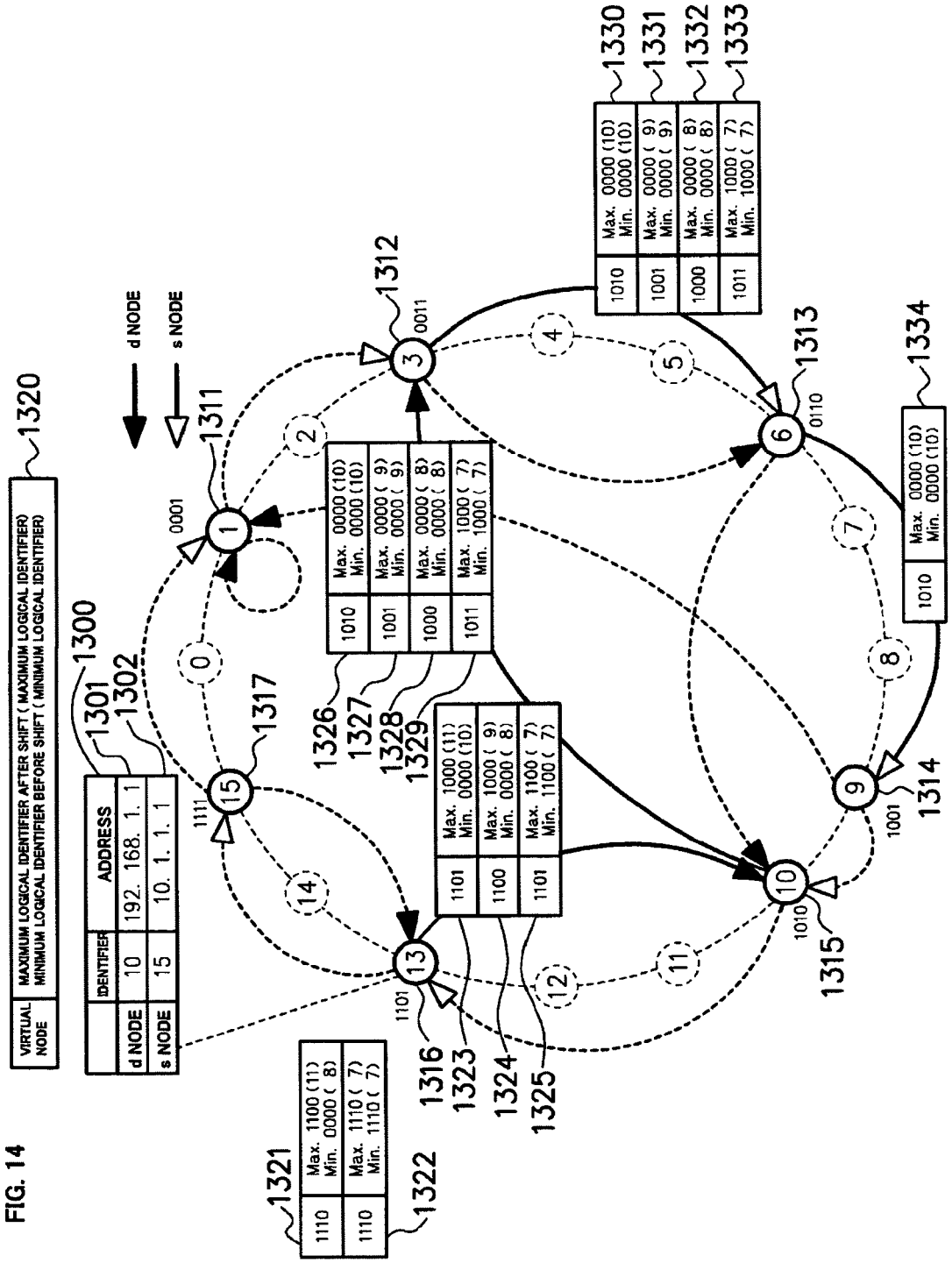
FIG. 14 is an illustration which shows an example of a message flow between peers according to the second exemplary embodiment of the present invention.
Figure 15:
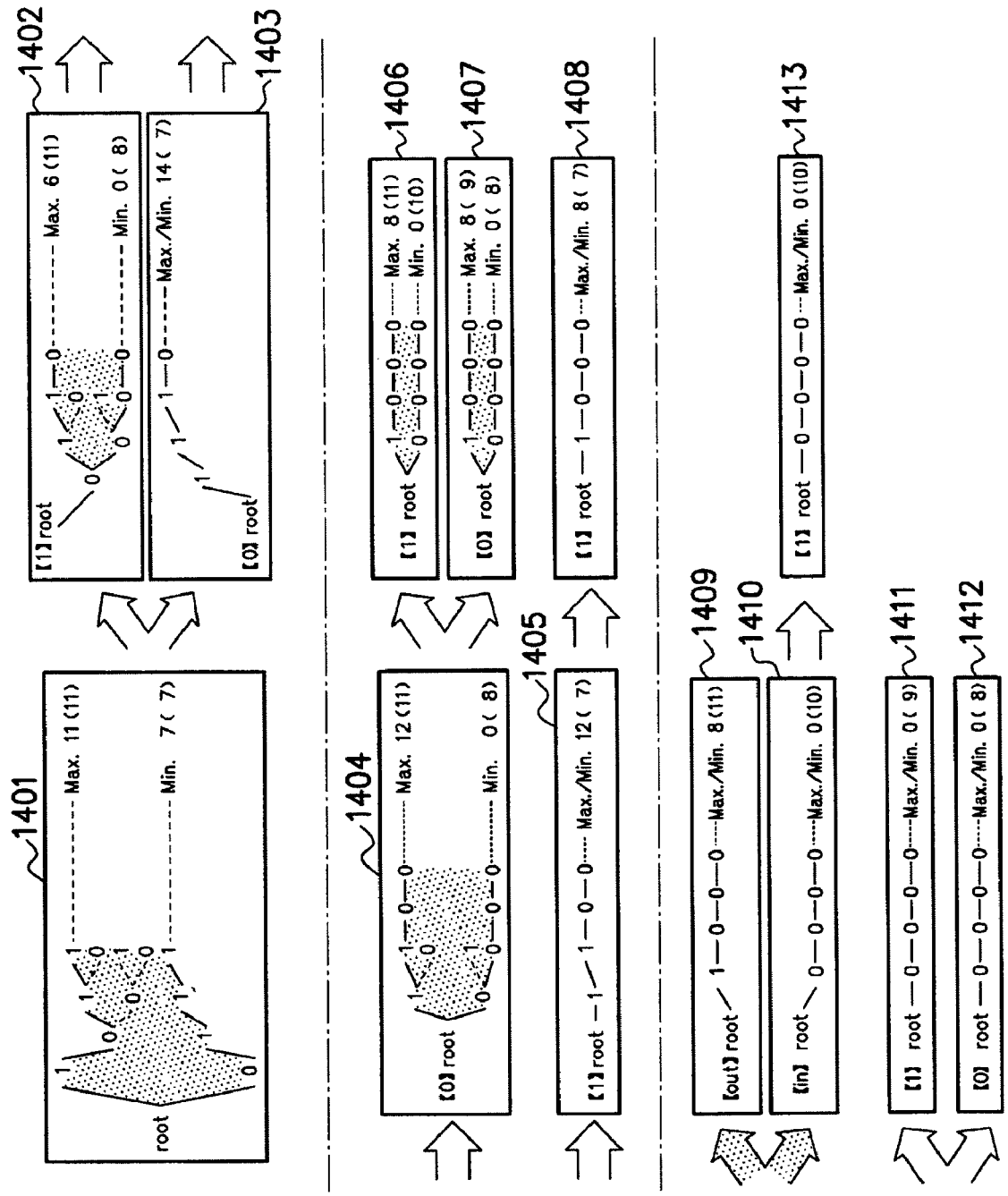
FIG. 15 is an illustration showing an algorithm of a left bit shift range dividing processing according to the second exemplary embodiment of the present invention.
Figure 16:
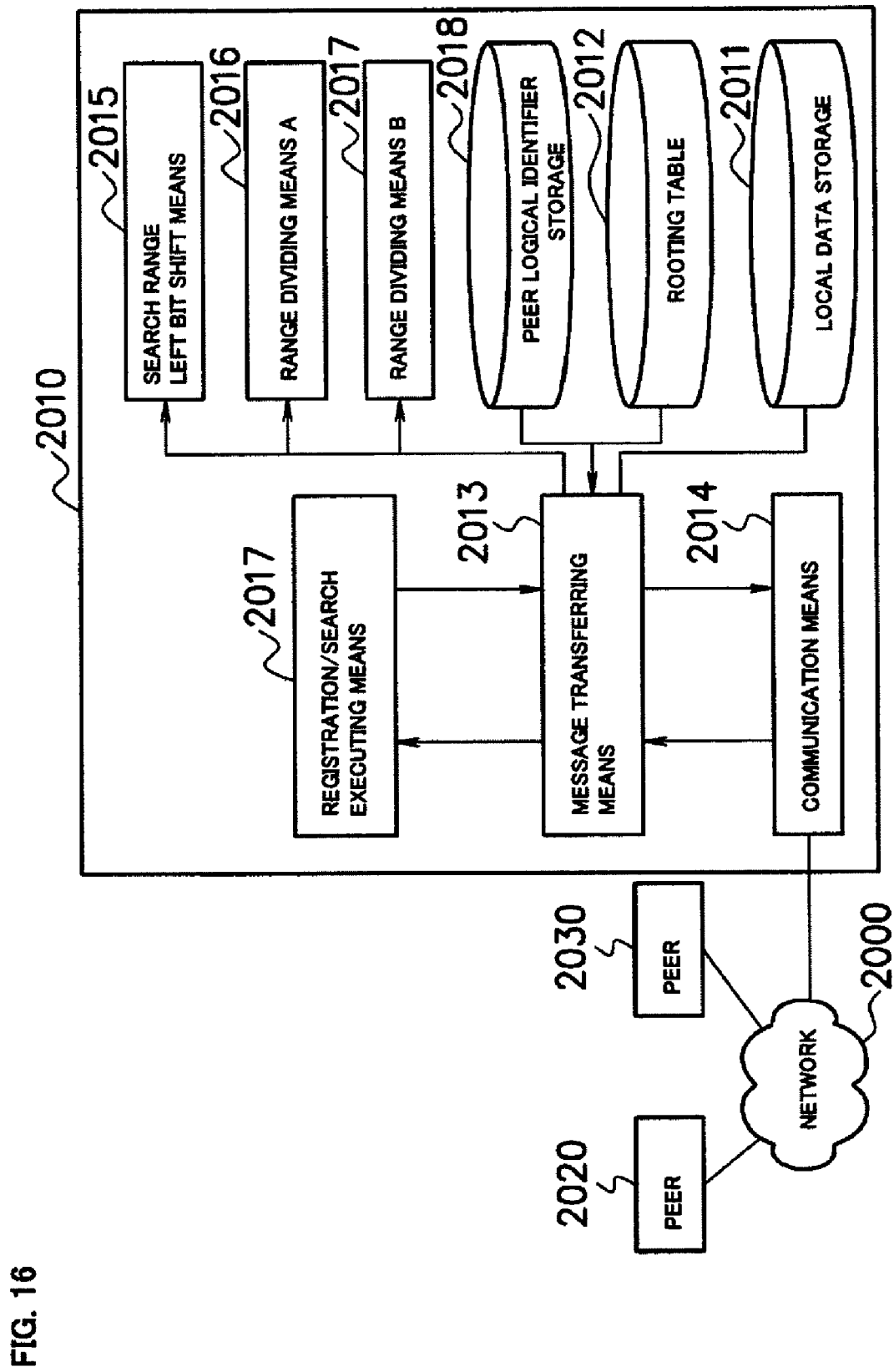
FIG. 16 is a block diagram which shows a configuration of a data search system according to the third exemplary embodiment of the present invention.
Figure 17:
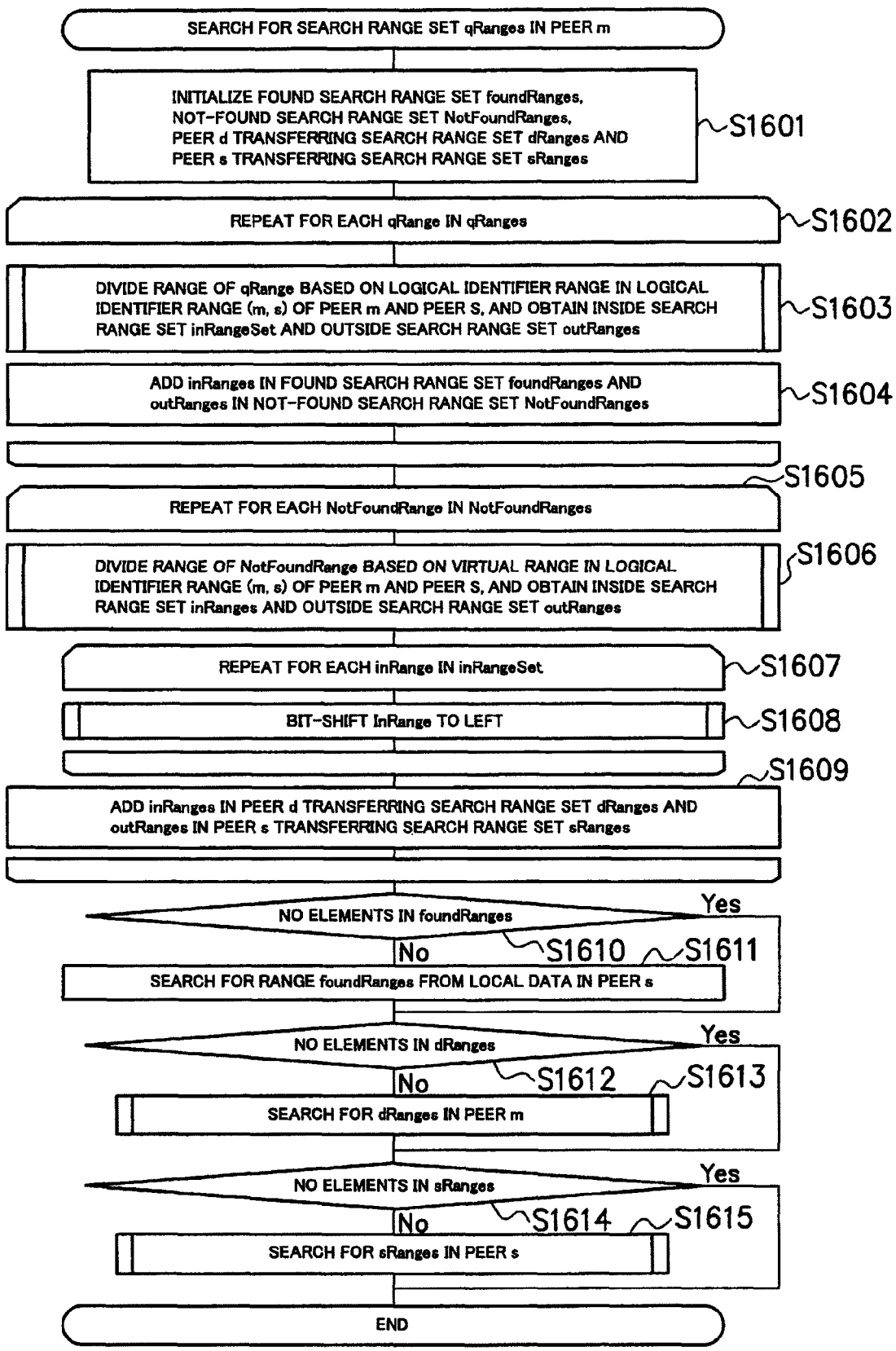
FIG. 17 is a flow chart which shows a data search procedure according to the third exemplary embodiment of the present invention.
Figure 18:
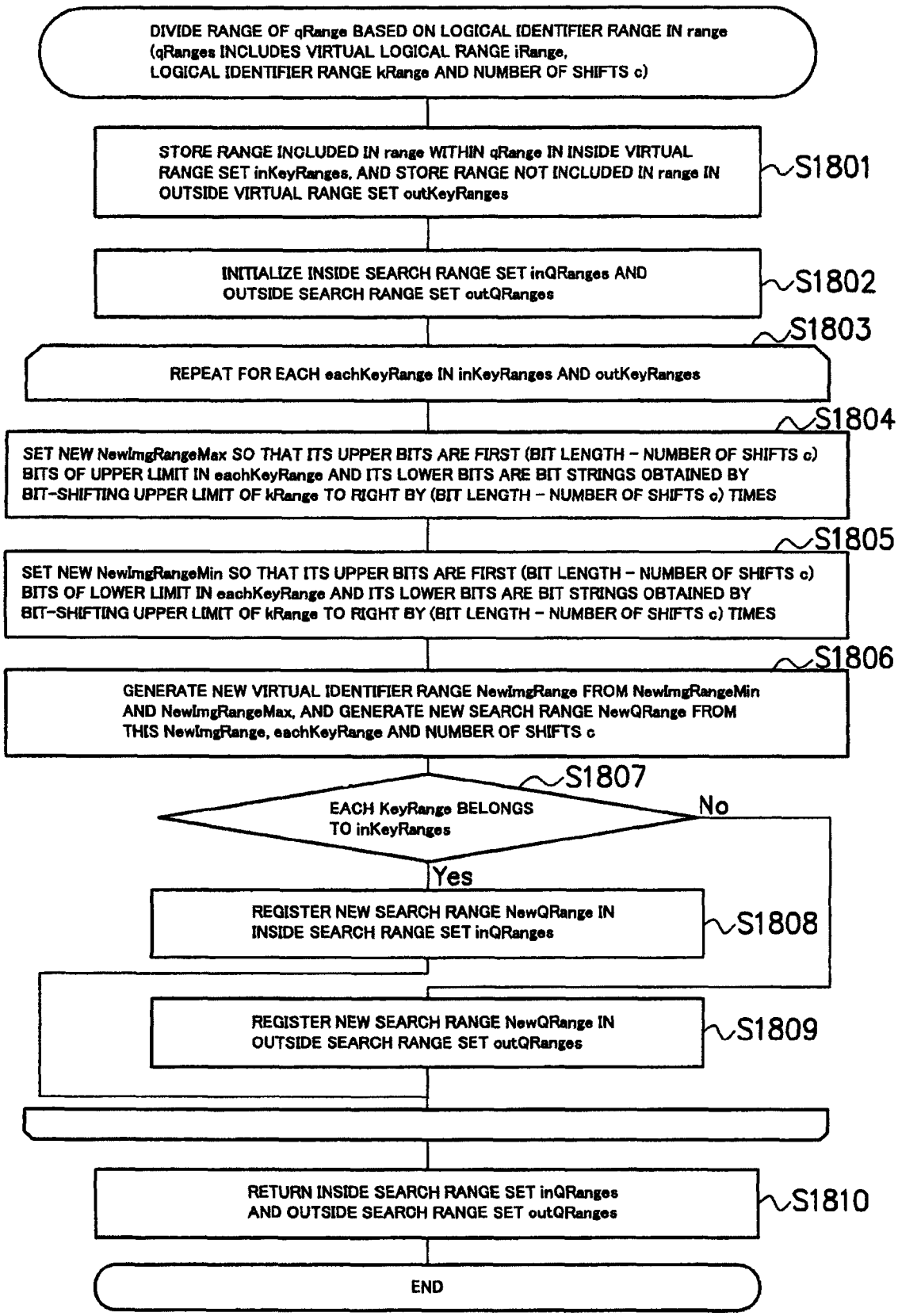
FIG. 18 is a flow chart which shows a processing that range dividing means A performs according to the third exemplary embodiment of present invention.
Figure 19:
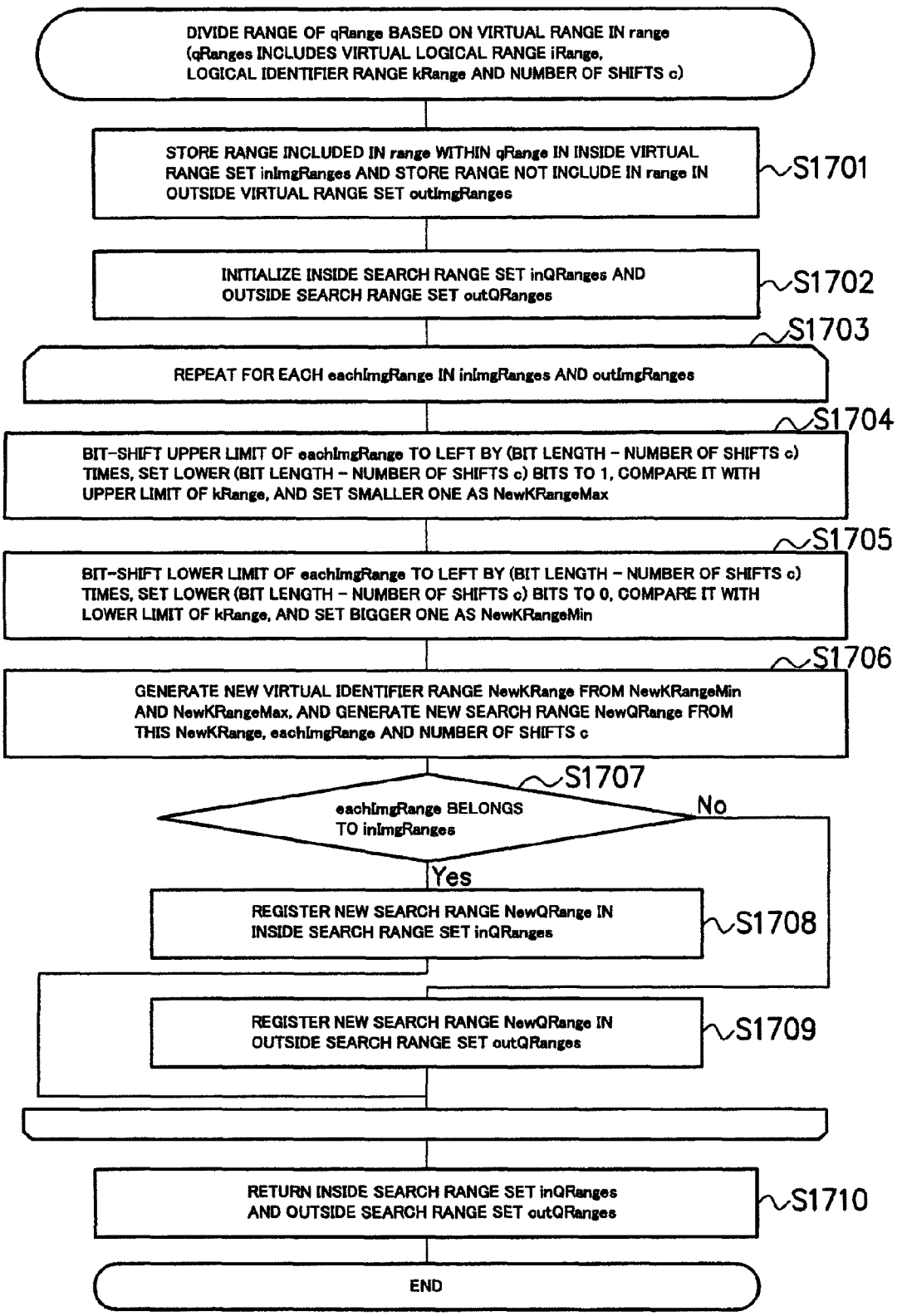
FIG. 19 is a flow chart which shows a processing that range dividing means B performs according to the third exemplary embodiment of the present invention.
Figure 20:
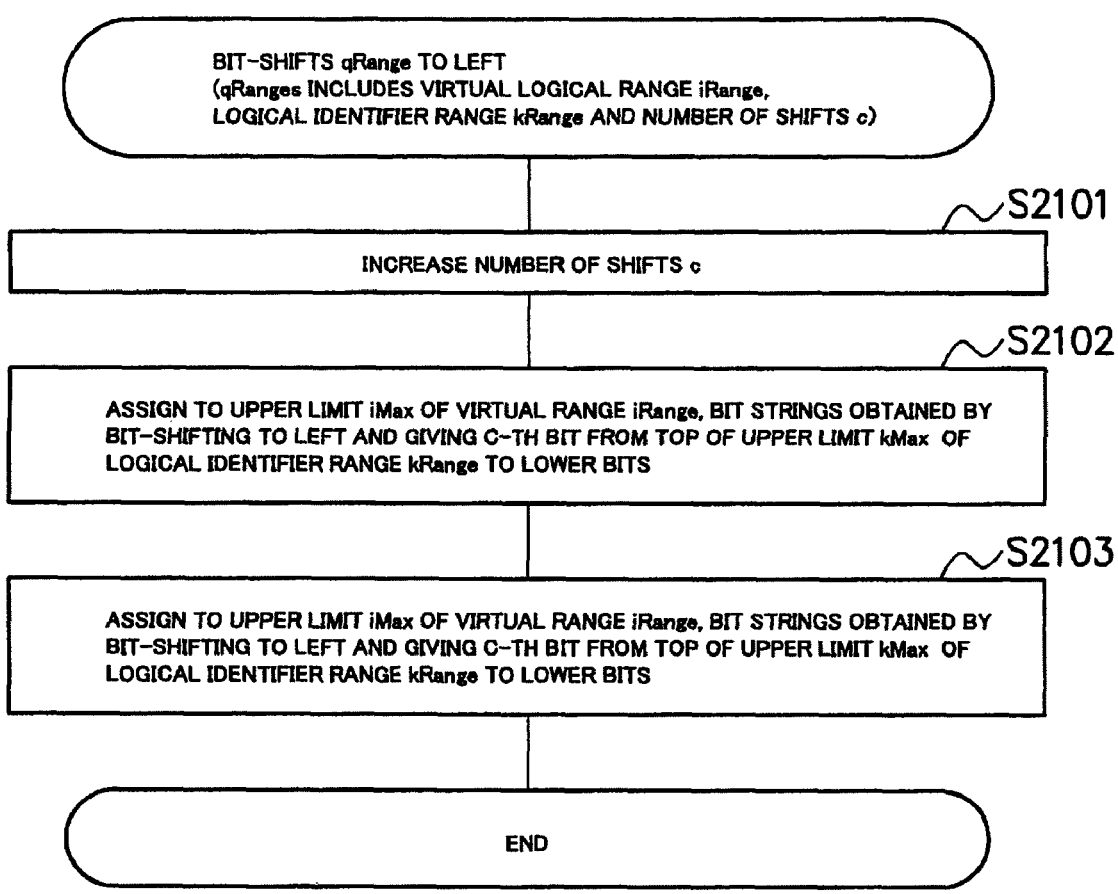
FIG. 20 is a flow chart which shows a processing that search range left bit shift means performs according to the third exemplary embodiment of the present invention.
Figure 21:
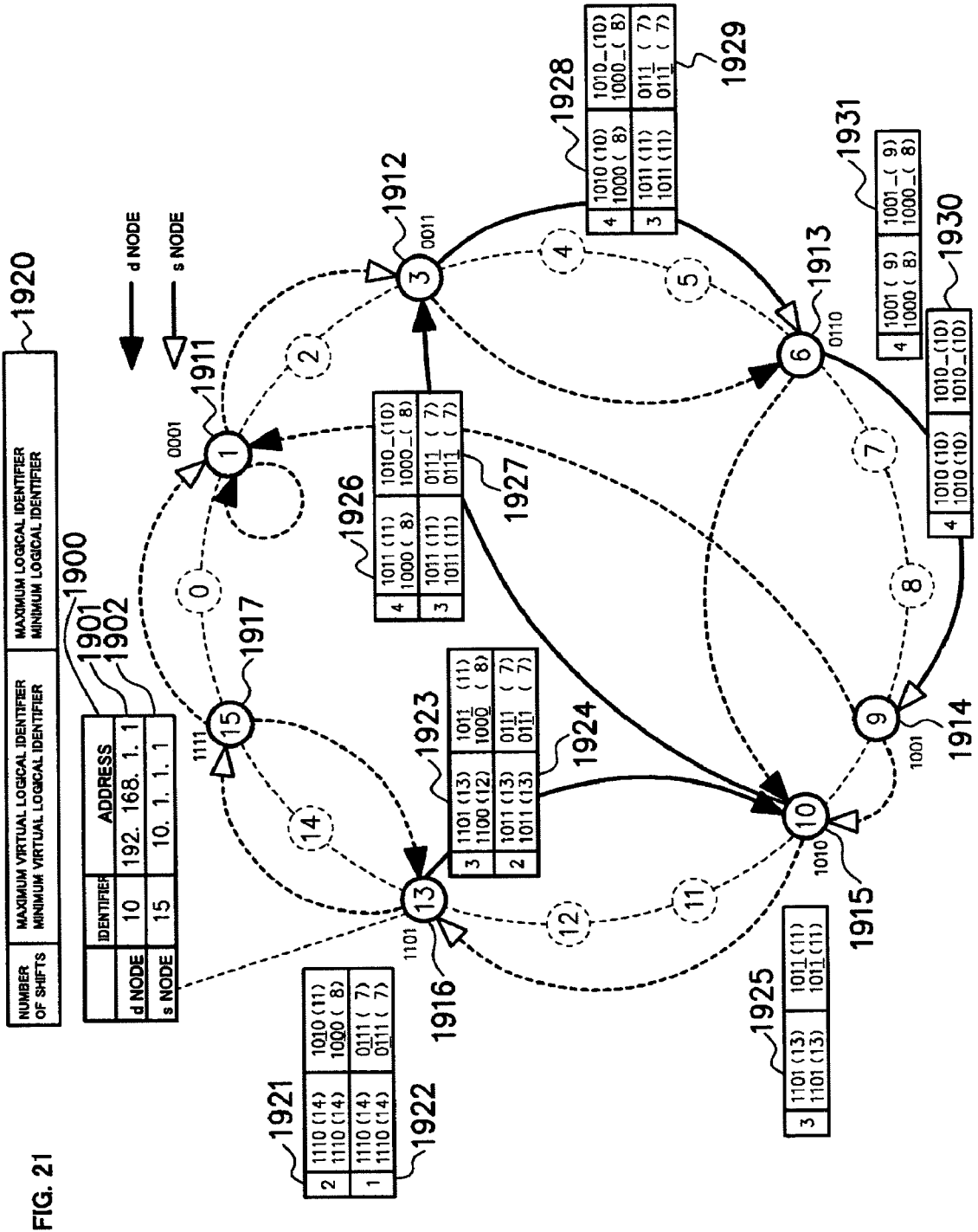
FIG. 21 is an illustration which shows an example of a message flow between peers according to the third exemplary embodiment of the present invention.

DENOTATION OF REFERENCE NUMERALS 110,120,130 nodes
115 CPU
810,820,830 peers
811 local data storage
812 routing table
813 message transferring means
814 communication means
815 range dividing means
816 left bit shift range dividing means
817 registration/search executing means
2010, 2020, 2030 peers
2011 local data storage
2012 routing table
2013 message transferring means
2014 communication means
2015 search range left bit shift means
2016 range dividing means A
2017 range dividing means B
2018 peer logical identifier storage
2019 registration/search executing means

The invention claimed is:

1. A data search device that is located on a network and searches for data shared with another device, comprising:
   a processor;
   a dividing unit, executed on the processor, that divides a logical identifier range based on a logical identifier between own logical identifier and a logical identifier of a successor if a division condition of the logical identifier range requested to search for is met; and
   a search request transferring unit that transfers a search request including the logical identifier range acquired by the dividing unit to a same or different device that meets a forwarding destination condition of the search request,
   wherein the dividing unit performs a left bit shift range dividing processing that divides the logical identifier range into a plurality of logical identifier ranges such that first bits become the same in each of the logical identifier ranges, and bit-shifts the plurality of divided logical identifier ranges to the left if the division condition of the logical identifier range requested to search for is met.

2. The data search device according to claim 1, wherein the dividing unit compares a first bit of a lower limit with that of an upper limit in the logical identifier range, bit-shifts the logical identifier range to the left when the first bits are the same, and performs the left bit shift range dividing processing when the first bits are different.

3. The data search device according to claim 1, further comprising:
   a range dividing unit that divides the logical identifier range requested to search for into two logical identifier ranges with the logical identifier of the successor as a border,
   wherein the dividing unit performs the left bit shift range dividing processing to a higher one of the two logical identifier ranges divided by the range dividing unit when a virtual node that is previously set is included between the own logical identifier and the logical identifier of the successor, and
   the search request transferring unit transfers the search request including the virtual node as well as the logical identifier range being the search target.

4. The data search device according to claim 2, further comprising:
   a range dividing unit that divides the logical identifier range requested to search for into two logical identifier ranges with the logical identifier of the successor as a border,
   wherein the dividing unit performs the left bit shift range dividing processing to a higher one of the two logical identifier ranges divided by the range dividing unit when a virtual node that is previously set is included between the own logical identifier and the logical identifier of the successor, and
   the search request transferring unit transfers the search request including the virtual node as well as the logical identifier range being the search target.

5. A data search device that is located on a network and searches for data shared with another device, comprising:
   a processor;
   a dividing unit, executed on the processor, that divides a logical identifier range based on a logical identifier between own logical identifier and a logical identifier of a successor if a division condition of the logical identifier range requested to search for is met; and
   a search request transferring unit that transfers a search request including the logical identifier range acquired by the dividing unit to a same or different device that meets a forwarding destination condition of the search request,
   wherein the dividing unit comprises:
   a first dividing unit that divides the logical identifier range requested to search for into two logical identifier ranges in a specific range between the own logical identifier and the logical identifier of the successor based on the logical identifier range;
   a second dividing unit that divides a logical identifier range that is not included in the specific range of the logical identifier ranges divided by the first dividing unit, based on a virtual range that is previously set in the specific range; and
   a range left bit shift unit that bit-shifts to the left, a logical identifier range included in the specific range of the logical identifier ranges divided by the second dividing unit, and increases the number of shifts,
   wherein, the search request transferring unit transfers the search request including the virtual range and the number of shifts as well as the logical identifier range being the search target.

6. A data search system comprising a plurality of terminals located on a network and searching for data shared with the terminals, wherein
   each terminal comprising:
   a dividing unit that divides a logical identifier range based on a logical identifier between own logical identifier and a logical identifier of a successor if a division condition of the logical identifier range requested to search for is met; and
   a search request transferring unit that transfers a search request including the logical identifier range acquired by the dividing means to a same or different device that meets a forwarding destination condition of the search request, wherein the dividing unit performs a left bit shift range dividing processing that divides the logical identifier range into a plurality of logical identifier ranges such that first bits become the same in each of the logical identifier ranges, and bit-shifts the plurality of divided logical identifier ranges to the left if the division condition of the logical identifier range requested to search for is met.

7. A data search method that is executed according to a control program by a control unit of a terminal that shares data with another terminal located on a network, the method comprising:

a dividing step of dividing a logical identifier range based on a logical identifier between own logical identifier and a logical identifier of a successor if a division condition of the logical identifier range requested to search for is met; and a search request transferring step of transferring a search request including the logical identifier range acquired by the dividing step to a same or different device that meets a forwarding destination condition of the search request, wherein the dividing step performs a left bit shift range dividing processing that divides the logical identifier range into a plurality of logical identifier ranges such that first bits become the same in each of the logical identifier ranges, and bit-shifts the plurality of divided logical identifier ranges to the left if the division condition of the logical identifier range requested to search for is met.

8. The data search method according to claim 7, wherein, in the dividing step, a first bit of a lower limit is compared with that of an upper limit in the logical identifier range, the logical identifier range is bit-shifted to the left when the first bits are the same, and the left bit shift range dividing processing is performed when the first bits are different.

9. The data search method according to claim 7, further comprising:

a range dividing step of dividing the logical identifier range requested to search for into two logical identifier ranges with the logical identifier of the successor as a border, wherein, in the dividing step, the left bit shift range dividing processing is performed to a higher one of the two logical identifier ranges divided by the range dividing step when a virtual node that is previously set is included between the own logical identifier and the logical identifier of the successor, and in the search request transferring step, the search request including the virtual node as well as the logical identifier range being the search target is transferred.

10. The data search method according to claim 8, further comprising:

a range dividing step of dividing the logical identifier range requested to search for into two logical identifier ranges with the logical identifier of the successor as a border, wherein, in the dividing step, the left bit shift range dividing processing is performed to a higher one of the two logical identifier ranges divided by the range dividing step when a virtual node that is previously set is included between the own logical identifier and the logical identifier of the successor, and in the search request transferring step, the search request including the virtual node as well as the logical identifier range being the search target is transferred.

11. A data search method that is executed according to a control program by a control unit of a terminal that shares data with another terminal located on a network, the method comprising:

a dividing step of dividing a logical identifier range based on a logical identifier between own logical identifier and a logical identifier of a successor if a division condition of the logical identifier range requested to search for is met; and a search request transferring step of transferring a search request including the logical identifier range acquired by the dividing step to a same or different device that meets a forwarding destination condition of the search request, wherein the dividing step comprises:

a first dividing step of dividing the logical identifier range requested to search for into two logical identifier ranges in a specific range between the own logical identifier and the logical identifier of the successor based on the logical identifier range;

a second dividing step of dividing a logical identifier range that is not included in the specific range of the logical identifier ranges divided by the first dividing step, based on a virtual range that is previously set in the specific range; and a range left bit shift step of bit-shifting to the left, a logical identifier range included in the specific range of the logical identifier ranges divided by the second dividing step, and increasing the number of shifts, wherein, in the search request transferring step, the search request including the virtual range and the number of shifts as well as the logical identifier range being the search target is transferred.

12. A computer-readable non-transitory medium storing a data search program for a computer located on a network to search for data shared with another computer, the program allows the computer to execute:

a dividing processing of dividing a logical identifier range based on a logical identifier between own logical identifier and a logical identifier of a successor if a division condition of the logical identifier range requested to search for is met; and a search request transferring processing of transferring a search request including the logical identifier range acquired by the dividing processing to a same or different device that meets a forwarding destination condition of the search request, wherein the dividing processing performs a left bit shift range dividing processing that divides the logical identifier range into a plurality of logical identifier ranges such that first bits become the same in each of the logical identifier ranges, and bit-shifts the plurality of divided logical identifier ranges to the left if the division condition of the logical identifier range requested to search for is met.

13. The computer-readable non-transitory medium storing the data search program according to claim 12, wherein, in the dividing processing, a first bit of a lower limit is compared with that of an upper limit in the logical identifier range, the logical identifier range is bit-shifted to the left when the first bits are the same, and the left bit shift range dividing processing is performed when the first bits are different.

14. The computer-readable non-transitory medium storing the data search program according to claim 12, further comprising:

a range dividing processing of dividing the logical identifier range requested to search for into two logical identifier ranges with the logical identifier of the successor as a border, wherein, in the dividing processing, the left bit shift range dividing processing is performed to a higher one of the two logical identifier ranges divided by the range dividing processing when a virtual node that is previously set is included between the own logical identifier and the logical identifier of the successor, and in the search request transferring processing, the search request including the virtual node as well as the logical identifier range being the search target is transferred.

15. The computer-readable non-transitory medium storing the data search program according to claim 13, further comprising:

a range dividing processing of dividing the logical identifier range requested to search for into two logical identifier ranges with the logical identifier of the successor as a border, wherein, in the dividing processing, the left bit shift range dividing processing is performed to a higher one of the two logical identifier ranges divided by the range dividing processing when a virtual node that is previously set is included between the own logical identifier and the logical identifier of the successor, and in the search request transferring processing, the search request including the virtual node as well as the logical identifier range being the search target is transferred.

16. A computer-readable non-transitory medium storing a data search program for a computer located on a network to search for data shared with another computer, the program allows the computer to execute:

a dividing processing of dividing a logical identifier range based on a logical identifier between own logical identifier and a logical identifier of a successor if a division condition of the logical identifier range requested to search for is met; and a search request transferring processing of transferring a search request including the logical identifier range acquired by the dividing processing to a same or different device that meets a forwarding destination condition of the search request, wherein the dividing processing comprises:

a first dividing processing of dividing the logical identifier range requested to search for into two logical identifier ranges in a specific range between the own logical identifier and the logical identifier of the successor based on the logical identifier range;

a second dividing processing of dividing a logical identifier range that is not included in the specific range of the logical identifier ranges divided by the first dividing processing, based on a virtual range that is previously set in the specific range; and a range left bit shift processing of bit-shifting to the left, a logical identifier range included in the specific range of the logical identifier ranges divided by the second dividing processing, and increasing the number of shifts, wherein, in the search request transferring processing, the search request including the virtual range and the number of shifts as well as the logical identifier range being the search target is transferred.

17. A data search device that is located on a network and searches for data shared with another device, comprising:

dividing means for dividing a logical identifier range based on a logical identifier between own logical identifier and a logical identifier of a successor if a division condition of the logical identifier range requested to search for is met; and search request transferring means for transferring a search request including the logical identifier range acquired by the dividing means to a same or different device that meets a forwarding destination condition of the search request, wherein the dividing means performs a left bit shift range dividing processing that divides the logical identifier range into a plurality of logical identifier ranges such that first bits become the same in each of the logical identifier ranges, and bit-shifts the plurality of divided logical identifier ranges to the left if the division condition of the logical identifier range requested to search for is met.

18. A data search system comprising a plurality of terminals located on a network and searching for data shared with the terminals, wherein each terminal comprising:

dividing means for dividing a logical identifier range based on a logical identifier between own logical identifier and a logical identifier of a successor if a division condition of the logical identifier range requested to search for is met; and search request transferring means for transferring a search request including the logical identifier range acquired by the dividing means to a same or different device that meets a forwarding destination condition of the search request, wherein the dividing means performs a left bit shift range dividing processing that divides the logical identifier range into a plurality of logical identifier ranges such that first bits become the same in each of the logical identifier ranges, and bit-shifts the plurality of divided logical identifier ranges to the left if the division condition of the logical identifier range requested to search for is met.

* * * * *